Jan. 6, 1953 A. D. LUND 2,624,106
APPARATUS FOR ASSEMBLING STORAGE BATTERY ELEMENTS
Filed Jan. 8, 1949 12 Sheets-Sheet 4
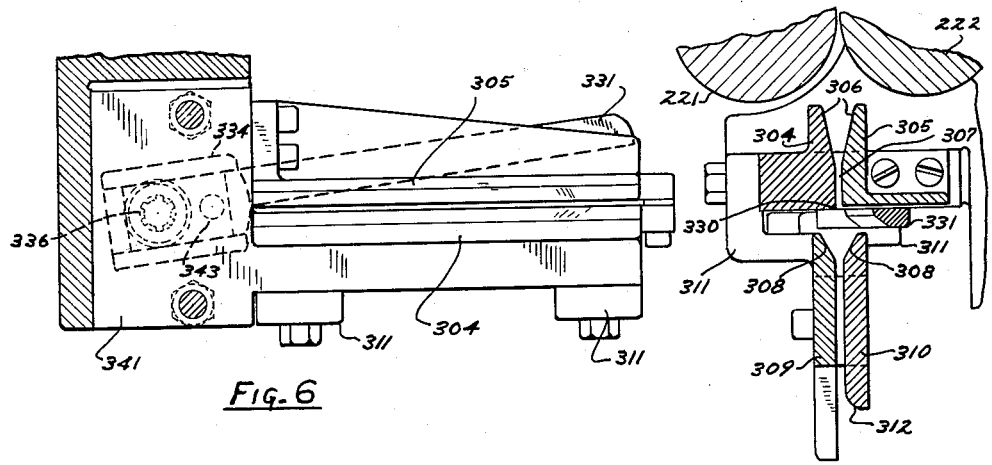
Fig. 6
Fig. 7
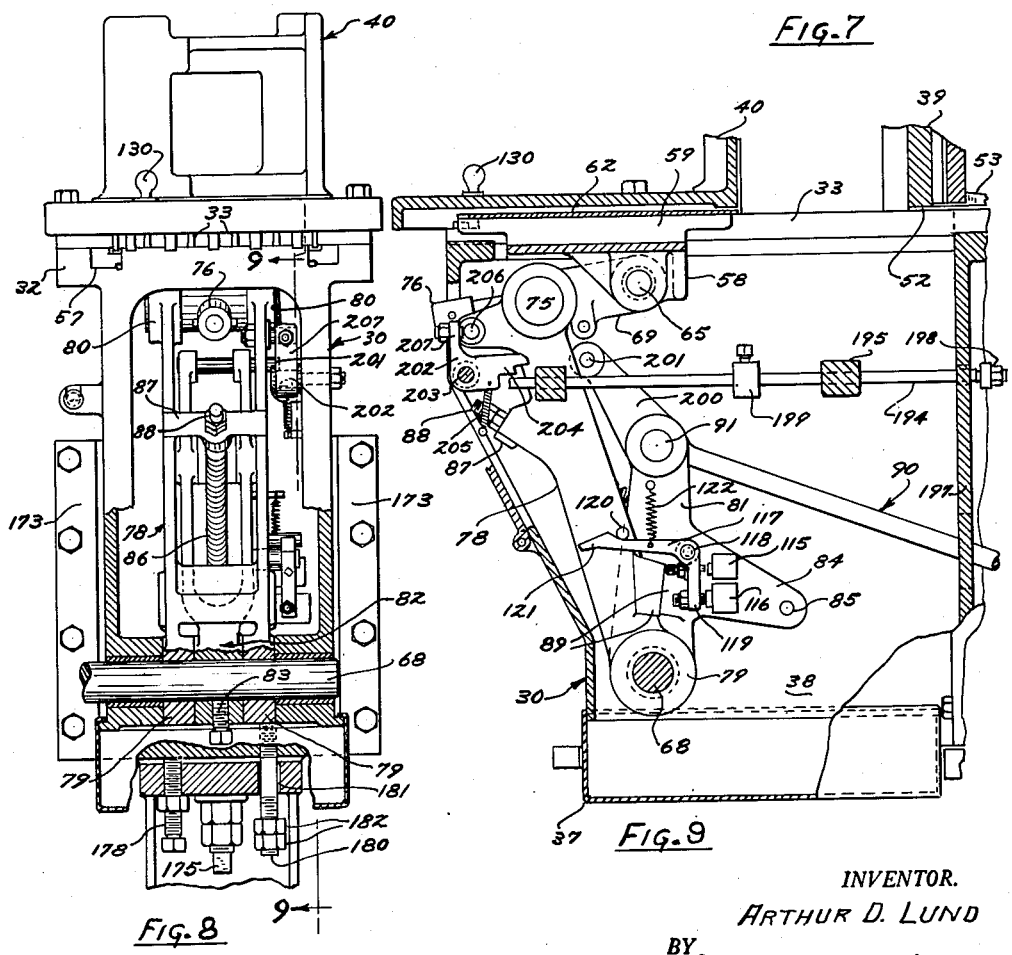
Fig. 8
Fig. 9
INVENTOR.
ARTHUR D. LUND
BY
Carlsen + Hagle
ATTORNEYS Jan. 6, 1953 A. D. LUND 2,624,106
APPARATUS FOR ASSEMBLING STORAGE BATTERY ELEMENTS
Filed Jan. 8, 1949 12 Sheets-Sheet 5
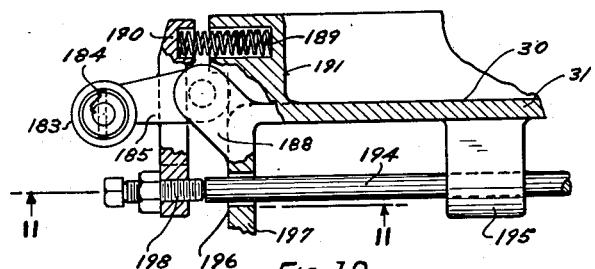
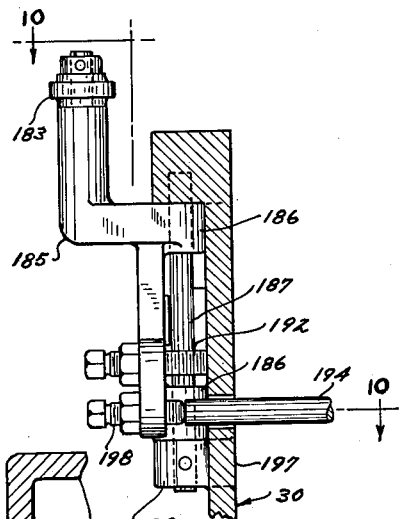
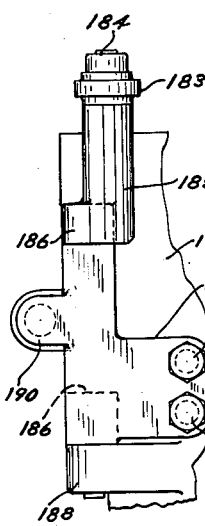
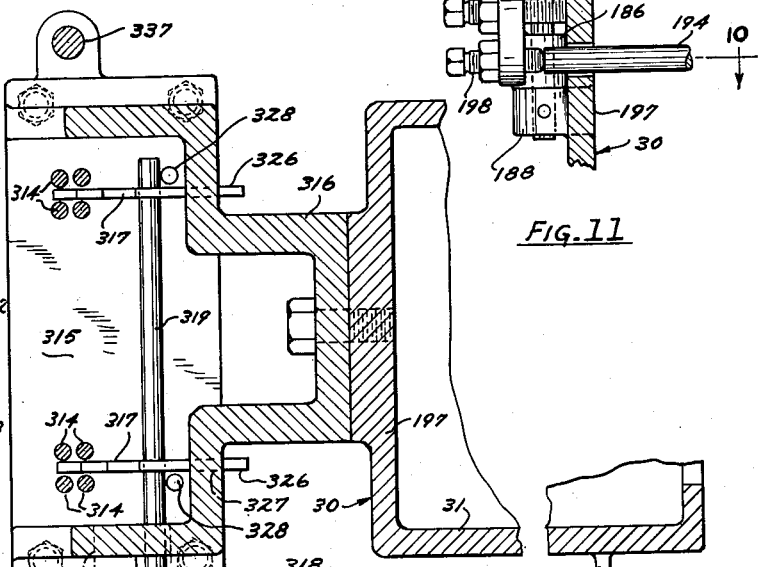
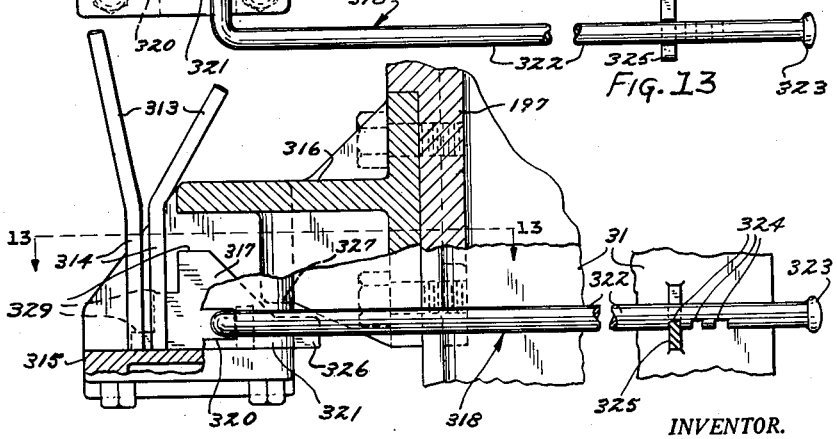
INVENTOR.
ARTHUR D. LUND
BY
ATTORNEYS Jan. 6, 1953  A. D. LUND  2,624,106
APPARATUS FOR ASSEMBLING STORAGE BATTERY ELEMENTS
Filed Jan. 8, 1949  12 Sheets-Sheet 6

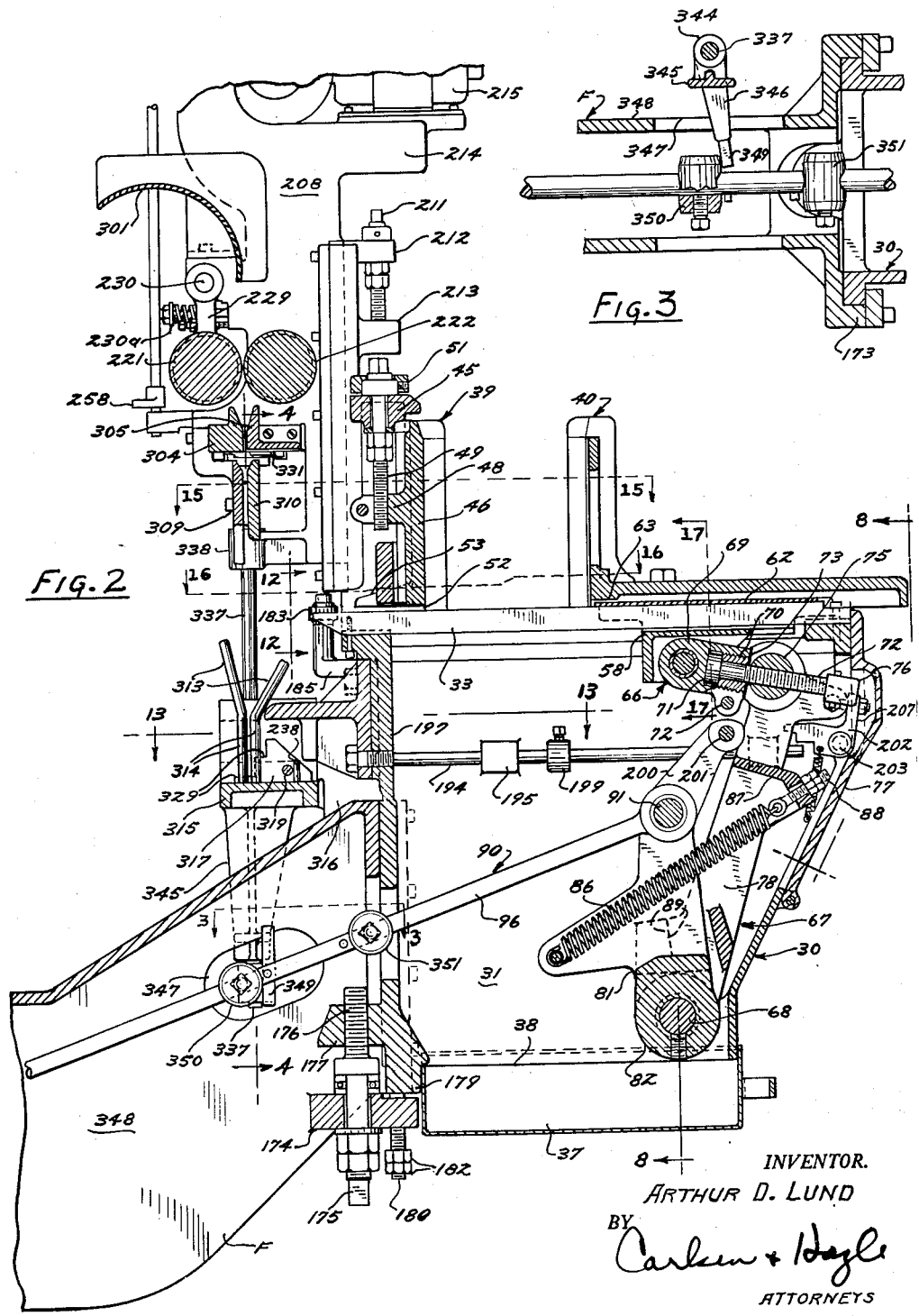

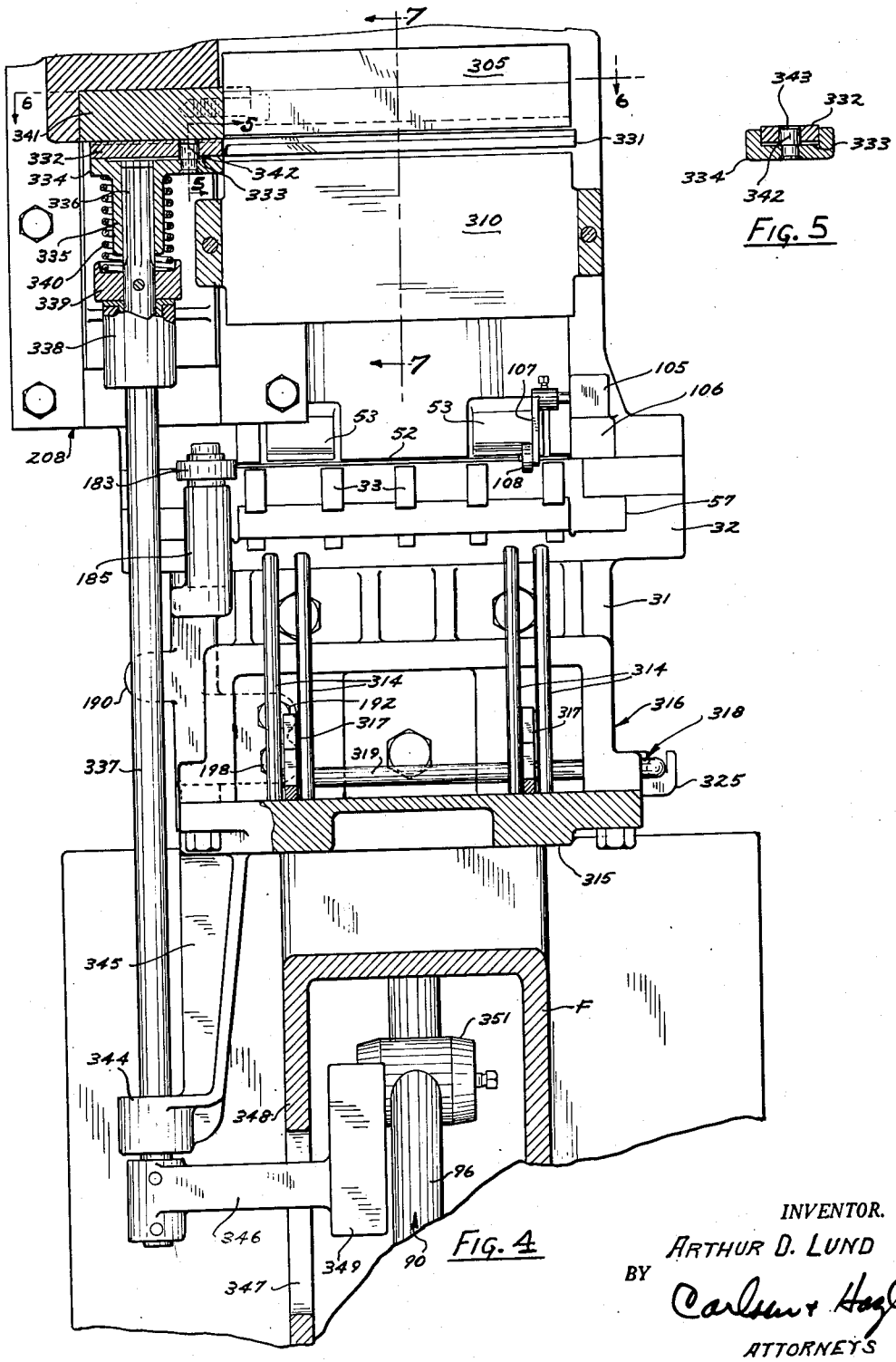

INVENTOR.
ARTHUR D. LUND
BY
Carlsen & Hagle
ATTORNEYS

Jan. 6, 1953 A. D. LUND 2,624,106
APPARATUS FOR ASSEMBLING STORAGE BATTERY ELEMENTS
Filed Jan. 8, 1949 12 Sheets-Sheet 9
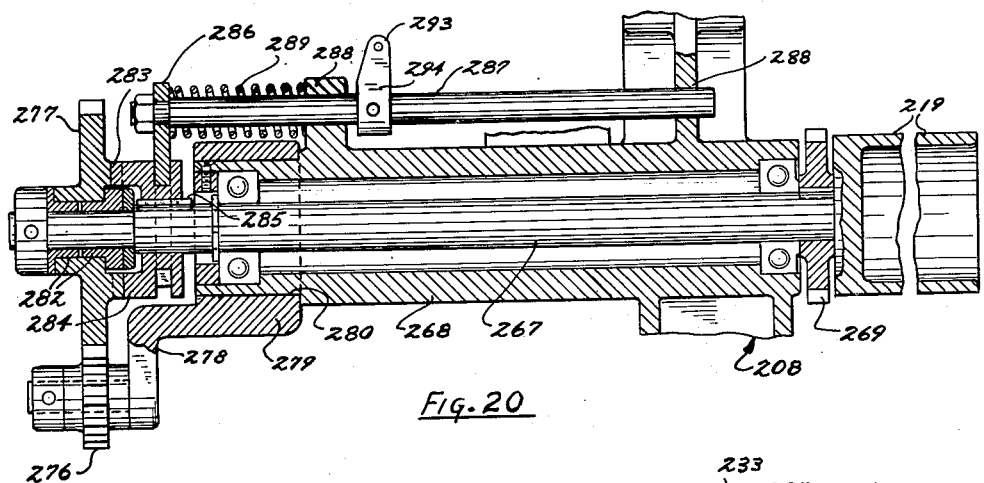
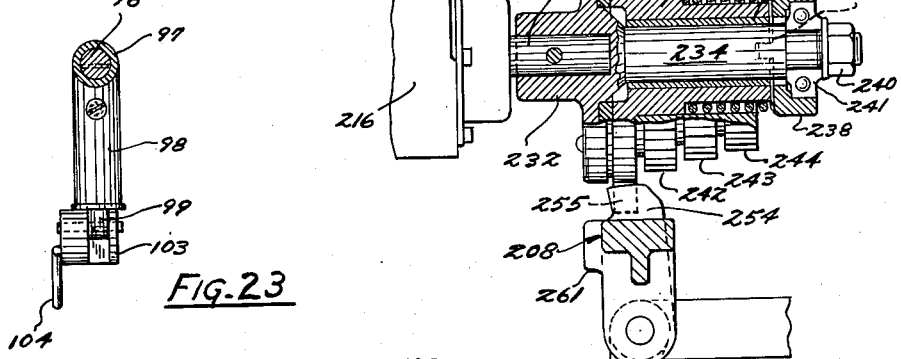
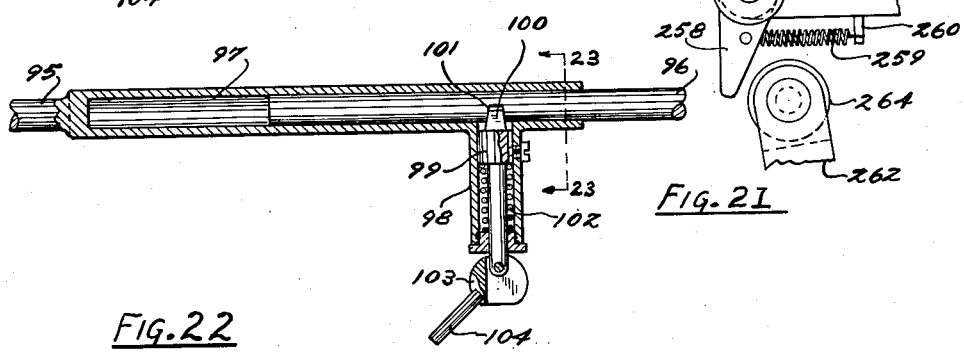
INVENTOR.
ARTHUR D. LUND
BY
Carlsen & Hazle
ATTORNEYS Jan. 6, 1953 A. D. LUND 2,624,106
APPARATUS FOR ASSEMBLING STORAGE BATTERY ELEMENTS
Filed Jan. 8, 1949 12 Sheets-Sheet 12

INVENTOR.
ARTHUR D. LUND
BY
ATTORNEYS

Patented Jan. 6, 1953

2,624,106

UNITED STATES PATENT OFFICE 2,624,106

APPARATUS FOR ASSEMBLING STORAGE BATTERY ELEMENTS

Arthur D. Lund, Minneapolis, Minn., assignor to Solar Corporation, Milwaukee, Wis., a corporation of Delaware Application January 8, 1949, Serial No. 69,963

4 Claims. (Cl. 29—204)

This invention relates to an apparatus for assembling the positive and negative plates and separators making up the cell units for storage batteries and has as its primary object certain improvements in the type of machines shown in my Patent No. 2,324,523, and in my prior co-pending application, Serial No. 631,991, filed November 30, 1945, now Patent No. 2,523,910, issued September 26, 1950. In both instances, these machines include a series of supply stations each with means for supporting stacks of plates or separators, and a series of collecting units or receiving shelves operatively supported to move in succession past the stations. There is also provided means at the supply stations for transferring the plates and separators in proper order to the collecting units wherein these elements are assembled in stacks ready for removal from the machine and the subsequent and various operations of assembly into the batteries.

It is well known in the battery making art, at the present time, that the use of oxide retention mats, particularly upon the opposite sides of the positive plates, is of considerable advantage in that these mats retain the active material in the plate and prevent shedding of the material and also act to some extent as an insulation. It is accordingly an important object of my present invention to provide means whereby such mats may be automatically applied to the positive plates as these plates are transferred from the aforesaid supply stations into the collecting units. Thus, this application of the glass mats takes place as a part of the completely automatic assembly and grouping of the plates and separators.

At present the mats used for the positive plates are made of spun glass, commonly called fiber glass, and this material is of a nature such that it may be supplied in a roll and taken off the roll in such length as required. My present invention therefore has a further and important object the provision of feeding mechanism by which this type of material may be fed off of the roll and cut into proper lengths as required to fold around one edge of the positive plates and embrace both sides thereof. This cutting and folding of the mat material takes place as the positive plates are in the act of transfer from the supply stations to the collecting units and in properly timed relation with this operation.

While I herein provide for the use of this fiber glass material, and for its application to only the positive plates, it is contemplated that other materials may be used whenever they are developed, that the materials may be applied to the negative plates in addition to, or instead of, the positive plates, and that such material, if its nature permits, may even replace the separators as presently used. The construction and the operation of my apparatus are such that all of these variations may be readily accommodated without material change of the apparatus.

My present invention further provides certain improvements in the feed mechanism by which the plates and separators are transferred to the collecting units from the supply stations and these and other less important objects will be made apparent in the course of the following specification.

In the drawing,

Fig. 2 is an enlarged vertical section through the positive plate station and showing a lower part of the mat feed mechanism.

Fig. 3 is an enlarged fragmentary sectional and plan view taken substantially along the line 3—3 in Fig. 2, and showing the means for operating the mat shearing mechanism.

Fig. 4 is an enlarged vertical section and inside end view taken substantially along the line 4—4 in Fig. 2, and particularly showing the mat shearing mechanism and adjacent parts of the positive plate station.

Fig. 5 has a sectional detail view along the line 5—5 in Fig. 4.

Fig. 6 is a plan view of the shearing mechanism for the mat, and adjacent parts of the structure, as viewed along the line 6—6 in Fig. 4.

Fig. 7 is a sectional detail view along the line 7—7 in Fig. 4.

Fig. 8 is an irregular sectional and outside end view of the positive plate station, taken substantially along the line 8—8 in Fig. 2, and showing in particular the plate feed mechanism.

Fig. 9 is a vertical sectional view substantially along the line 9—9 in Fig. 8.

Fig. 10 is a fragmentary horizontal sectional view taken at an inside corner portion of the positive plate station and showing the arrangement of a roller by which the plate is laterally engaged for proper alignment of the plate lugs in the collector, this view being taken along the line 10—10 in Fig. 11.

Fig. 11 is a vertical sectional view and elevation of the mechanism of Fig. 10 as viewed along the line 11—11 in Fig. 10.

Fig. 12 is a fragmentary inside elevation of the mechanism shown in Figs. 10 and 11, and viewing the same as from the left hand side in Fig. 11. The plane at which this view is taken is also indicated by the line 12—12 in Fig. 2.

Fig. 13 is a fragmentary horizontal sectional view along the line 13—13 in Fig. 2, and showing the adjustable stop means for the mat material. The plane on which this view is taken is further indicated by the line 13—13 in Fig. 14.

Fig. 14 is a side elevation, partially in vertical section of the mechanism and associated frame parts shown in Fig. 13.

Figure 15:
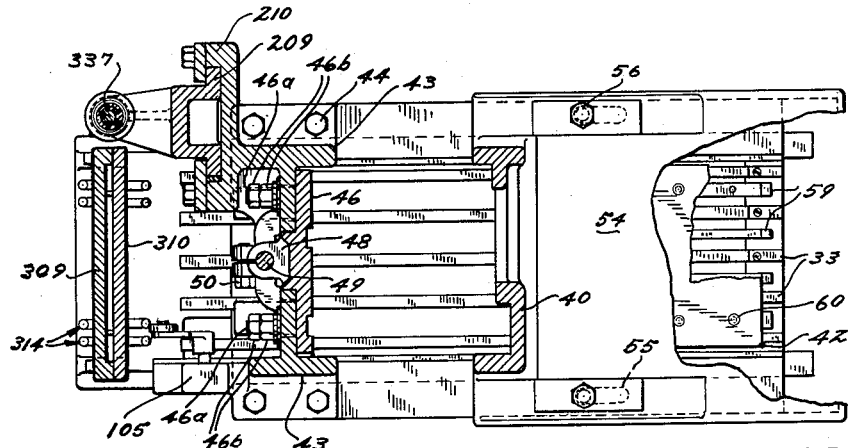

Fig. 15 is a horizontal section and plan view taken along the line 15—15 in Fig. 2.

Figure 16:
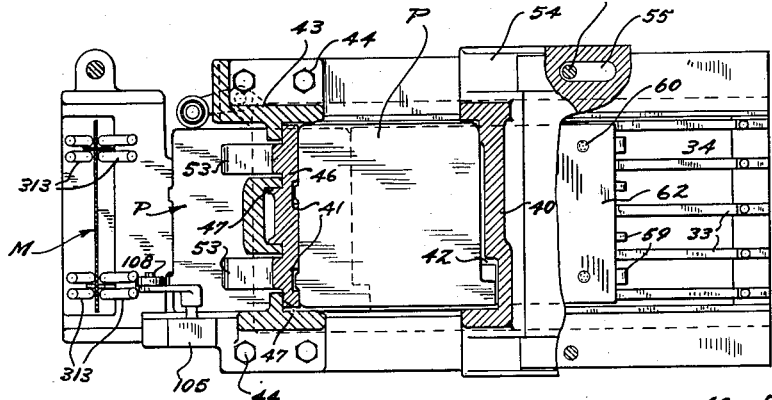

Fig. 16 is a similar view taken at a lower plane and along the line 16—16 in Fig. 2.

Figure 17:
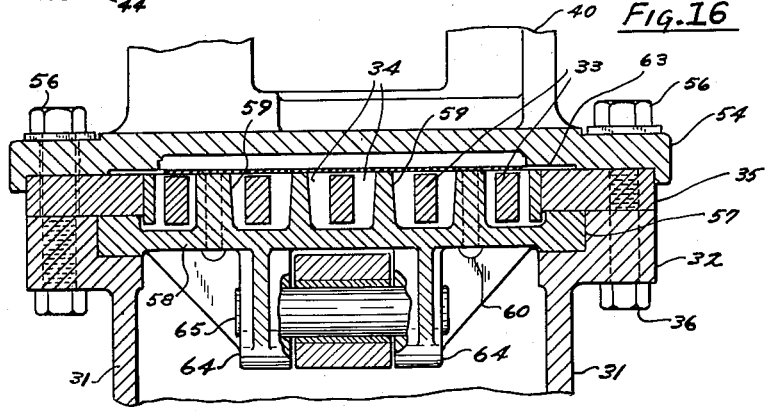

Fig. 17 is an enlarged vertical cross section through the lower part of the positive plate hopper and ejector as taken along the line 17—17 in Fig. 2.

Figure 18:
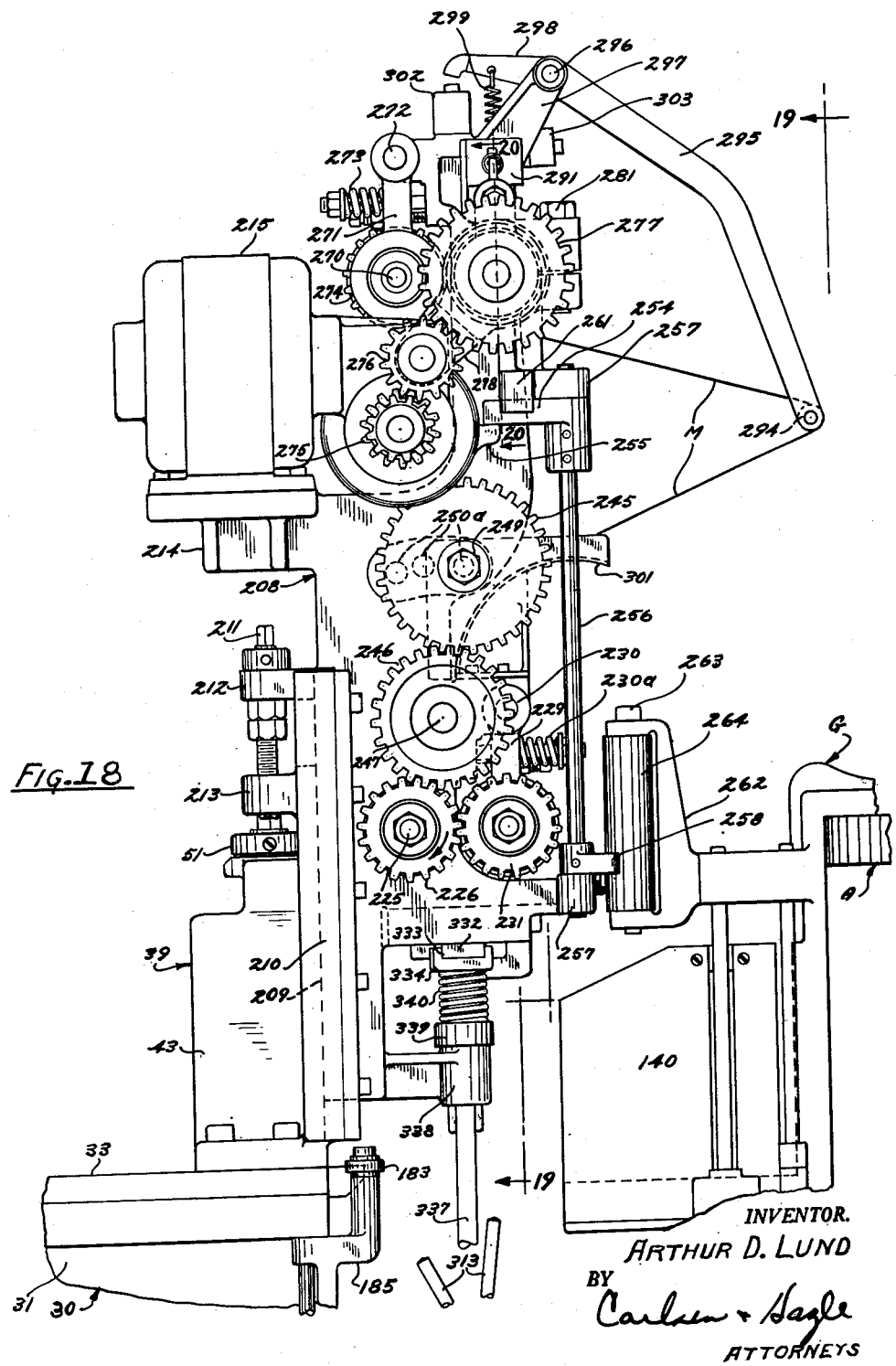
Figure 24:
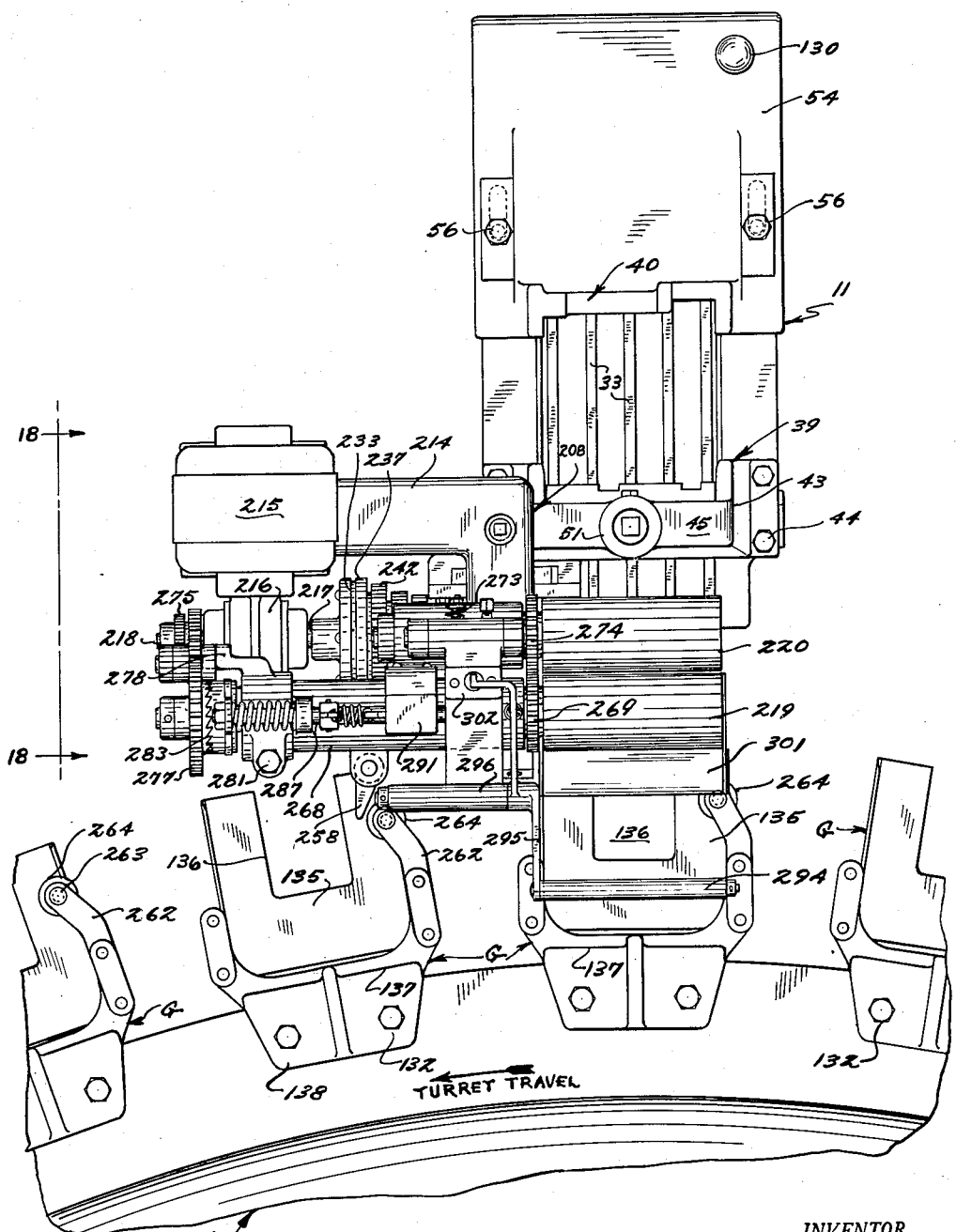

Fig. 18 is an enlarged side elevation through a central part of the mat feed mechanism as viewed along the line 18—18 in Fig. 24.

Figure 19:
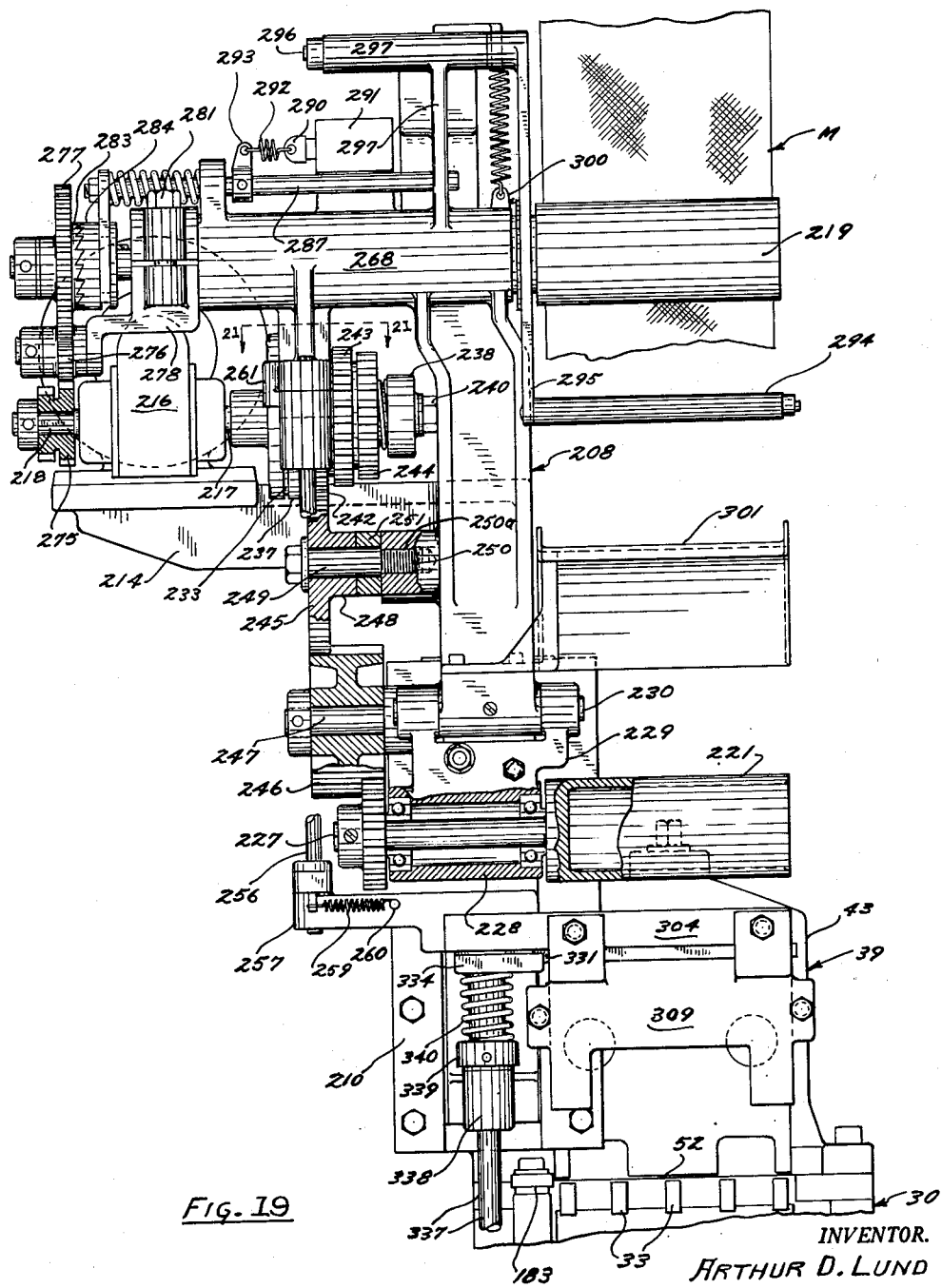

Fig. 19 is an inside end view of certain parts, broken away and in section, and taken substantially along the line 19—19 in Fig. 18.

Fig. 20 is an enlarged vertical cross sectional view through the mat feed release mechanism and taken along the line 20—20 in Fig. 18.

Fig. 21 is a horizontal sectional view through the drive clutch and speed change mechanism for the mat feed and taken along the line 21—21 in Fig. 19.

Figure 1:
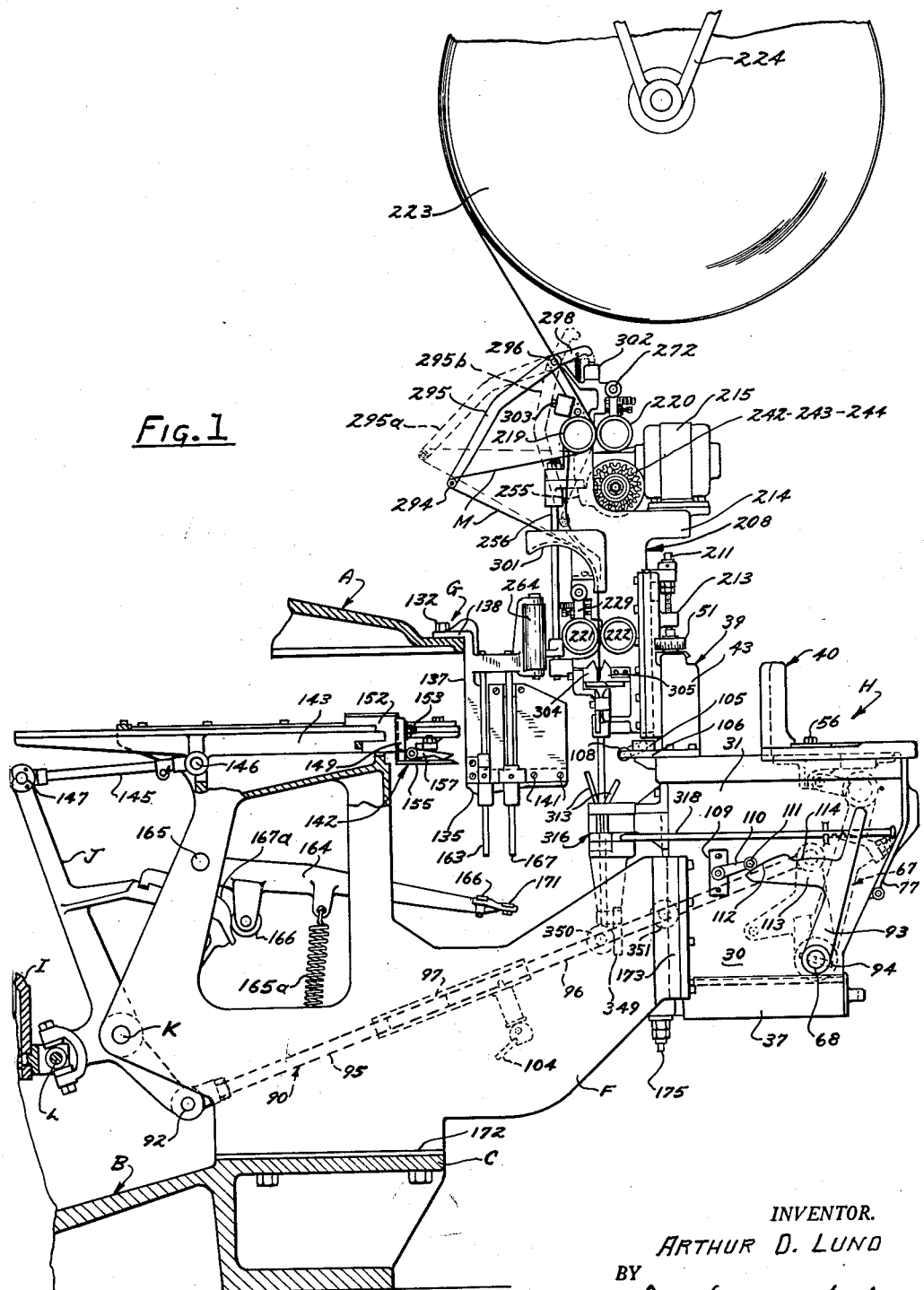
Fig. 1 is a vertical sectional view and side elevation of a positive plate feeding station and showing the mat feeding mechanism associated therewith. This view further shows, in a radial section, one portion of the central operating mechanism which appears in more detail in my prior Patent No. 2,324,523.

Fig. 22 is an enlarged sectional detail view through the manual release and the plate feeding mechanism which appears in dotted lines in Fig. 1.

Fig. 23 is a sectional view along the line 23—23 in Fig. 22.

Fig. 24 is a plan view of a positive plate station, the associated mat feed mechanism and a series of the collector units.

Figure 25:
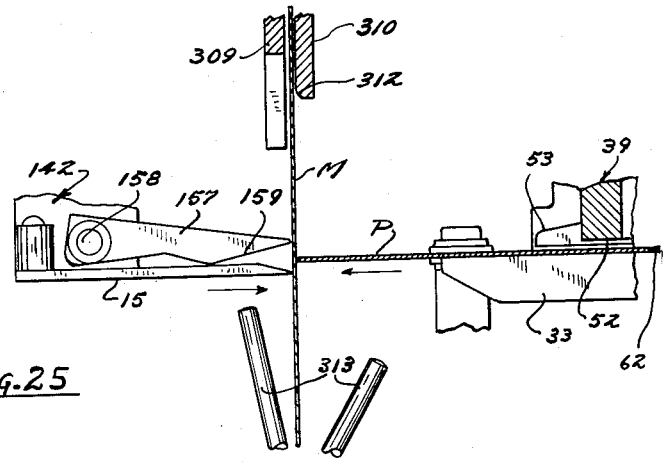
Figure 26:
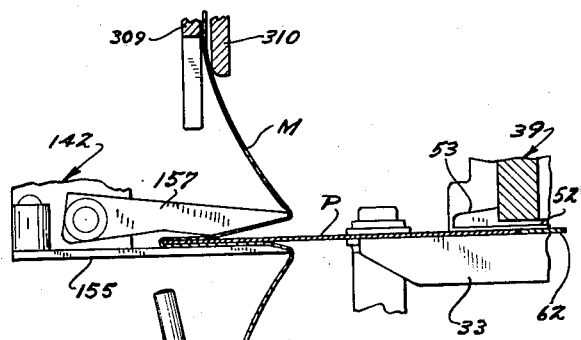
Figure 27:
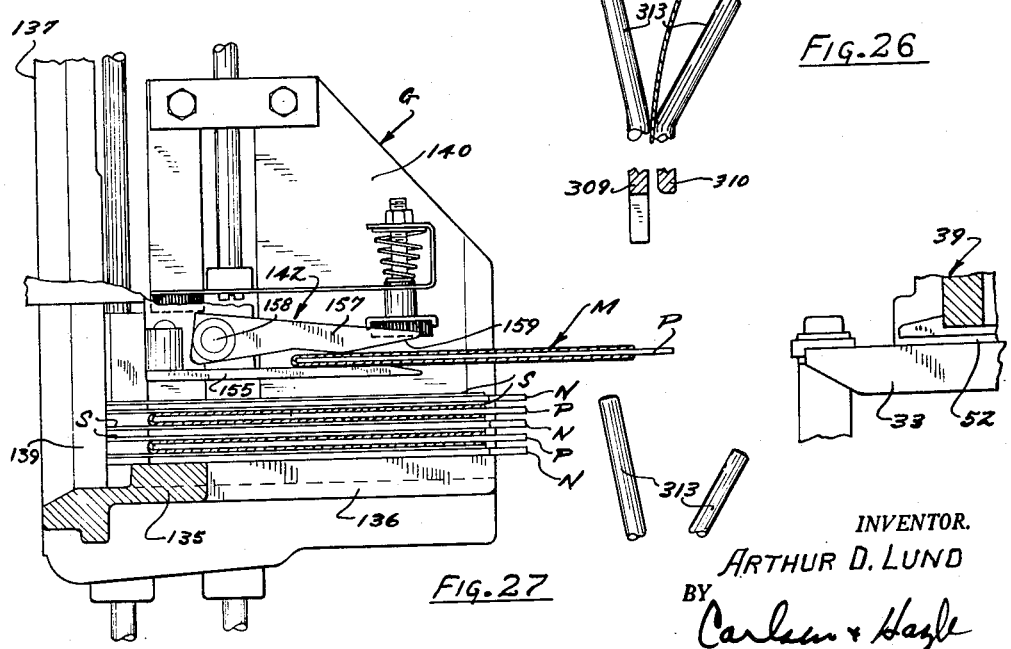
Figure 28:
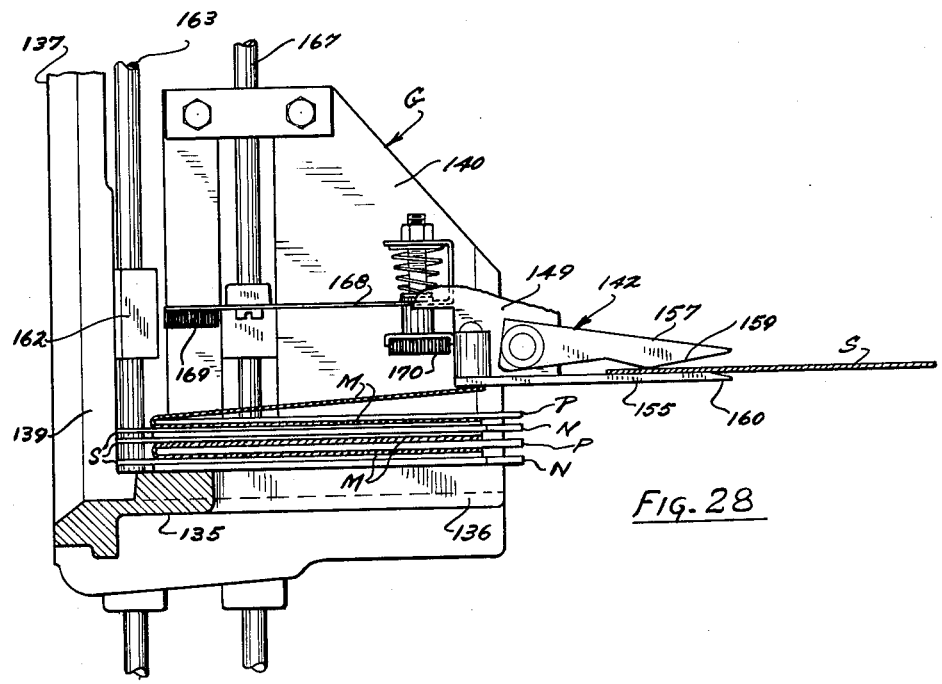

Figs. 25 through 28 are enlarged vertical sectional and diagrammatic views of one of the picker units by which the plates are transferred from the supply station to the collector unit, and showing successive stages in the application of the mat to a positive plate as it is being transferred. Figs. 27 and 28 also include in some detail the collector unit itself.

Figure 29:
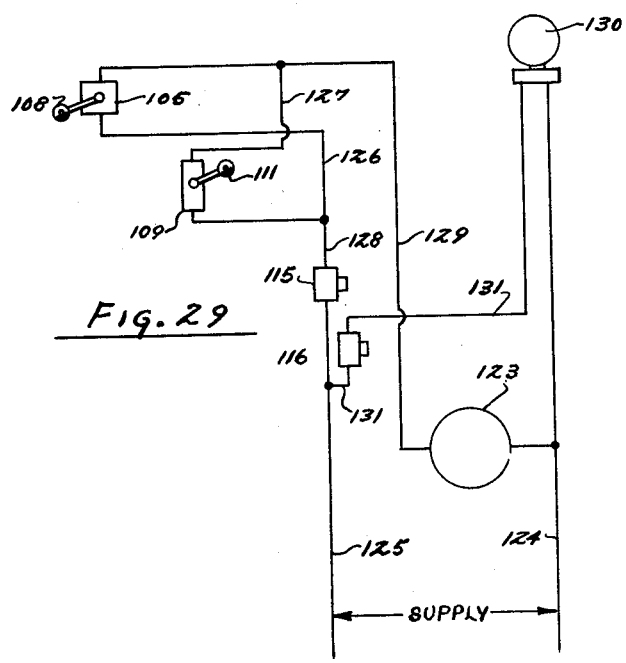

Fig. 29 is a schematic view showing the wiring for the control and signal switches for one station of the machine.

The ordinary storage battery cell unit comprises a series of positive and negative grid plates alternately arranged and with each two adjacent plates separated by an insulating sheet generally made of wood and commonly known as a separator. The positive plate side of each separator is ribbed to provide space for the free circulation of the electrolyte. The positive and negative plates have lugs at their upper corners and these lugs are reversed on the positive plates from those on the negative plates so that they may be bonded together and connected to the terminal posts which form the respective negative and positive output connections for the cell unit.

Throughout the drawings herein the positive plates are indicated at P and in Figs. 27 and 28 I show a partial assembly in which the negative plates are indicated at N and the separators at S. The machine of this application, in addition to performing the function of automatically grouping the negative and positive plates and separators in the proper sequence to build up a stack of these battery elements in proper arrangement for further assembly, also applies to the positive plates a mat which is designated generally at M, which is made of a flexible insulating material and is folded about the intended lower edge of the plates to embrace the opposite sides thereof. This mat, as will be clearly understood then serves not only as an added insulation between positive and negative plates in the group but, particularly if made of a fibrous material such as fiber glass, has the very desirable added function of retaining the active pasty material in the plate. As a matter of fact, the advantages flowing from the use of mats of this type in battery cell units are so well known as not to require further explanation herein.

Actually the complete assembling machine is not shown in the drawings herein inasmuch as in general its construction and operation is identical to that shown in my prior patents hereinbefore identified. In Figs. 1 and 24, there appears at A a rim portion of a circular turret which rotates in a horizontal plane with a step by step or intermittent movement. This turret A rotates about an upright pedestal which is not shown herein but which is positioned at the center of a circular stationary base casting B having an annular mounting shelf C whereon are mounted a plurality of stationary frames F extending in generally radial directions with respect to the center of the machine. Provided in closely spaced relation around the outer edge of the turret A is a series of collecting units or shelves designated generally at G which travel with the turret in a circular path about the series of frames F. Each of the aforesaid frames F carries at its outer portion a supply station, designated generally at H, and in setting up the machine for operation stacks or battery plates and separators are arranged in the stations H. In practice there will be first a stack of negative plates and then a stack of separators, a stack of positive plates and another stack of separators and this arrangement is repeated in succession around the machine so that as the turret moves the collector units G are brought in succession into a position for receiving the plates and separators in proper order from the supply stations. By the operation then of suitable feed mechanism and transfer devices as will be later pointed out the negative and positive plates and separators will be accumulated in stacks upon the collector units G and may be removed therefrom when groups of the desired number of plates have been built up. The only manual operation necessary is the periodic replenishment of the plates and separators in the supply stations, and periodic removal of assembled groups from the collector units.

Also forming part of the machine as disclosed in my earlier patents there is a vertically reciprocable hub or crosshead mounted about the aforesaid pedestal, of which hub the rim portion appears at I in Fig. 1. As pointed out by the patents this hub I is moved up and down in timed relation or synchronism with the intermittent rotative movements of the turret A and this movement is employed to operate the feed and transfer mechanisms for the plates at the respective supply stations of the present machine. For this purpose there is mounted at each of the stationary frames F a bell crank lever J fulcrumed at K on the frame, and one arm of each bell crank lever is pivoted at L to the rim I of the hub. As a result the aforesaid up and down movements of the hub will oscillate the bell crank levers J in vertical and radial planes. A positive plate supply station or hopper, and feed mechanism, will now be described in detail and reference is directed particularly to Figs. 1, 2, 8, 9, 15, 16 and 17, wherein these parts are shown to best advantage. The supply station comprises as its primary supporting element a hollow housing of irregular shape, indicated generally at 30, which is adjustably mounted upon the outer end of the associated frame F as will presently appear. The upper edges of the side walls 31 of the housing 30 are outwardly flanged as indicated at 32 and supported atop the housing is a grill-like hopper bottom plate having a plurality of spaced bars 33 between which are wide slots 34 opening out through the inner end facing the turret A. The hopper bottom further includes a frame 35 which is secured to the flanges 32 by bolts 36. The purpose of this grill construction for the hopper bottom is to permit any oxide, which may be displaced from the plates to fall down through the housing 30, and this material is then collected in a drawer 37 which closes the open lower end 38 of the housing. The drawer 37 may, of course, be periodically removed for disposal of the accumulated material therein.

The plates are arranged in stacks upon the hopper bottom and held in such position by inner and outer hopper ends indicated generally at 39 and 40. In Fig. 16 there is shown a stack of the positive plates P positioned between these hopper ends and it will be noted that the inner end has grooves 41 extending vertically to accommodate the usual feet formed on the bottom of the plates, while the outer hopper end 40 has a vertically extending recess 42 to accommodate the plate lugs. The inner hopper end 39 comprises a stationary arched frame casting 43 which is bolted as at 44 to the frame 35 and the sides of this casting are joined by an arch or yoke 45. A vertically adjustable gate or end plate 46 is slidably mounted between the sides 43 in suitable guides 47, and at its center this gate 46 has a split and tapped lug 48 through which is threaded the lower end of an adjusting screw 49. The lug 48 may be pulled together by a cap screw 50 to tighten it upon the threads of the screw 49 so that vibrations will not affect the adjustments of the gate 46. The feed screw 49 extends upwardly through the yoke 45 and is provided with a micrometer adjustment head 51 by which it may be turned in order to make very precise vertical adjustments of the gate. The positive plates may be moved, one at a time, inwardly toward the turret under the gate 46 and the purpose of the micrometer adjustment of the gate is to vary the opening, indicated at 52 in Fig. 2, between the lower edge of the gate and the hopper bottom, or upper faces of the bars 33, according to the different thicknesses in which the positive plates are manufactured. Since, as will be pointed out, plates are stripped from the bottom of the stack in the hopper, this adjustment must be made in order that the plates will be accurately fed, one at a time. Further as shown in Fig. 2, the hopper bottom bars 33 extend some distance inwardly from the gate 46 in order to provide a support for the plates as they are stripped from the stack, and in order to hold the plates against upward displacement the plate 46 has hold down feet 53 extending inwardly in the same direction.

The gate 46 is vertically slotted to accommodate studs 46ª having lock nuts 46ᵇ and these are adjusted to frictionally hold the gate to the casting 43 but permit the aforesaid up and down adjustment of the gate.

In addition to the difference in the thickness of the plates they are made in varying heights, and the outer hopper end 40 is made adjustable to accommodate these variations in plate sizes. This end 40 thus has an outwardly extending horizontal base plate 54 which is slotted at its side as indicated at 55 to accommodate cap screws 56 by which the plate is fastened to the hopper frame 35. The purpose of these slots 55 is of course to permit adjustment of the hopper end 40 toward and away from the inner end 39 in such fashion as to accommodate the hopper to the different sizes of plates.

The inner edges of the housing flanges 32 are grooved as indicated at 57 to slidably accommodate a stripper cross head 58 so that this cross head may slide beneath the hopper inwardly and outwardly or radially with respect to the turret A. The cross head 58 has spaced upwardly projecting ribs 59 arranged loosely in the slots 34 in the hopper bottom and projecting slightly above the level of the bars 33 as shown in Fig. 17. Placed upon the upper edges of these ribs 59 and secured thereto, as by means of rivets 60, is a thin stripper plate 62 adapted to travel above the bottom of the hopper, with the cross head. It will be noted that the bottom plate 54 of the outer hopper end 40 is undercut at 63 to provide clearance for this stripper plate and further that the stripper plate is supported clear of the bars 33 so that it does not contact them as it travels and wear by such contact. In its normal or inoperative position, shown in Figs. 2 and 15, the stripper plate 62 is located outwardly of the hopper and therefore clear of the stack of plates therein, but by inward movement of the cross head 58 the stripper plate may be moved inwardly toward the turret as indicated in Fig. 16 and will force the lowermost plate of the stack inwardly through the opening 52.

The stripper cross head 58 has transversely spaced depending bearings lugs 64 which carry a pin 65 whereon is pivoted the inner end of an adjustable connecting rod indicated generally at 66. The outer end of the connecting rod is attached, as will be presently described, to an actuating lever indicated generally at 67 pivotally mounted upon a cross shaft 68 arranged transversely at the lower, outer part of the housing 30. This actuating lever 67 is thus mounted for oscillation at its upper end in a vertical plane and inwardly and outwardly with respect to the machine to thus reciprocate the stripper plate 62 as necessary for stripping the plates from the stack. The lever 67 moves through a fixed stroke and in order to accommodate this stripping stroke of fixed amplitude to plates of different heights the connecting rod 66 is made adjustable as to length to thereby position the leading or working edge of the stripper plate 62 according to adjustments made on the outer hopper end 40 as previously described. The connecting rod 66 thus comprises a pivot casting 69 pivotally mounted on the aforesaid pin 65 and at its outer end the casting 69 has a threaded socket 70 in which is rotatably mounted the head 71 of an adjusting screw 72, held against axial displacement in the socket by a tubular plug 73 screwed thereinto. The usual clamp screw 72 is provided to prevent displacement of these parts and the screw 72 is threaded through a diametrical tapped bore in a pin 75 pivoted in the upper end of the actuating lever 67. The outer end of the screw 72 has a conventional fitting 76 and by swinging down a door 77 on the outer side of the housing 30 this fitting will be exposed for manipulation by a speed wrench to turn the screw. It is obvious that such manipulation of the screw 72 will vary the distance between the axes of the pins 65 and 75 and therefore adjust the stripper cross head with reference to the normal position of the stationary lever, and in effect position the working edge of the stripper plate with reference to the stack of plates, as should be clearly understood. Thus the lower edges of the plates will be moved inwardly from the hopper always to the same point, regardless of the height of the plates.

The actuating lever 67 is of two part construction and comprises a forked section 78 having spaced bearings 79 at its lower end by which it is rotatably mounted upon the aforesaid shaft 68. A cross pin 75 is also mounted between bearings 80 at the upper end of this section. Mounted between the sides of the lever section 78 is another section 81 having a bearing 82 at its lower end secured by a set screw 83 to the shaft 68 to swing therewith. The lever section 81 has an inwardly extending forked portion 84 connected by a pin 85 and the inner lower end of a retractile coil spring 86 is hooked over this pin as shown in Fig. 2. At some distance from the upper ends of the sides of the lever section 78 a web 87 is formed having an opening to accommodate a eye bolt 88 to which the outer and upper end of the spring 86 is attached. The lever sections 78 and 81 have cooperating stop lugs 89 which as shown in Fig. 9 normally are held in contact by the tension of the spring 86 so that the two lever sections operate as a unit. In order to swing this actuating lever assembly, and operate the stripper cross head as previously described, a pull rod indicated generally at 90 is pivotally attached at 91 to an upper end portion of the lever section 81 and extends downwardly and inwardly through the frame F to a point 92 at which the rod is pivoted to the lower end of the lever J. It will be at once apparent then that the upward movement of the operating hub I from its normal position shown in Fig. 1 will swing this lower end of the lever J inwardly and the pull of the rod 90 upon the lever section 81 will swing both lever sections 78—81 inwardly and move the stripper cross head 58 to the limit of its inward or working stroke. As the actuating hub I returns to starting position the lever 67 will, of course, be returned by the rod 90 to its starting position, returning the stripper cross head to its normal position. It will be apparent however, that should a plate jam in the hopper for any reason the tension of the spring 86 will be overcome, and the lever section 81 may swing inwardly alone so that the parts will not be damaged.

When a jam thus occurs it is, of course, necessary that it be manually cleared and for this purpose the shaft 68 is extended through one side wall 31 of the housing 30 and mounted on the shaft outside the housing is a hand lever 93. This lever is pinned at 94 to the shaft 68 to turn therewith in normal operation of the parts. When a jam occurs the stack of plates is removed from the hopper and the broken or otherwise damaged plates removed. A new plate is then inserted and may be moved inwardly by swinging the hand lever 93 and operating the actuating lever 67 by the shaft 68 so that the new plate will be moved to transferring position in order not to interfere with the timing of the machine as a whole. So that this feeding operation may be carried out the pull rod 90 is made in inner and outer sections 95 and 96 and the inner section 95 (as best shown in Fig. 22) has a tubular end 97 telescopically receiving the inner end of the section 96. The tubular section 97 also has a downwardly extending latch housing 98 in which is slidably and nonrotatably mounted a latch pin 99 having a tapered upper end 100 normally seating in a notch 101 in the rod section 96. The pin 99 is urged to such position by a coil spring 102 and thus the two rod sections 95 and 96 are normally connected to operate as a unit. A cam 103 having a handle 104 is pivotally attached to the lower end of the latch pin 99 however, and by manipulation of this cam it will be obvious that the pin may be pulled down to release its end from the notch 101 permitting relative axial movements of the rod sections. When the jam has been cleared, as aforesaid, the handle 104 is thus operated and it effectively disconnects the levers 67 and 93 from the lever J which normally actuates them and permits these levers to be operated by hand in order to feed the plate through its normal inward feeding travel and return the levers 67 and 93 to their normal outer positions will be understood. The handle 104 is then operated to restore the connection between the pin 99 and the notch 101 placing the lever 67 again under control of the lever J for automatic operation.

It is, of course, necessary that the machine be stopped when the jam occurs as just above described, or when for any reason a plate fails to feed from the hopper, since otherwise the timing of the operation as a whole would be completely interrupted. For this purpose a conventional lever operated electric switch 105 is mounted to one side of the inner or delivery end of the hopper upon a flange 106 on the inner hopper end casting 43 as is shown in Figs. 1 and 4.

The actuating arm 107 of the switch 105 carries a small roller 108 which normally hangs by gravity in the path of the plate emerging through the hopper 52. In this position of the arm 107 the switch 105 is opened and when a plate emerges from the hopper it contacts the roller 108 swinging the arm 107 upwardly and closing the switch. A similar switch 109 is mounted on the side wall 31 of the housing 30 inwardly of the hand lever 93 and the actuating arm 110 of this switch has a roller 111 which rides on and is normally held upwardly by a cam surface 112 formed on an inward extension 113 of the lever. In this position of the arm 110 the switch 109 is also closed. The cam surface 112 is centered about the axis of the shaft 68 and is of such length arcuately that for the initial inward movement of the hand lever 93, occurring as the feed motion of the plate starts, the switch will be held in this closed position. About the time, however, that the plate engages and raises the roller 108 closing the switch 105 the roller 111 controlling switch 109 moves off the cam surface 112 and drops into a lower arcuate edge 114 of the hand lever permitting the arm 110 to swing downwardly and open the switch 109. As will be presently pointed out the switches 105 and 109 are wired in parallel and placed in the circuit controlling the motor which operates the machine as a whole, in such manner that both of the switches must be opened before the circuit to the motor is interrupted. In operation, if a plate fails to feed from the hopper so that the switch 105 remains open, then as soon as the lever 93 swings through its initial inward movement the switch 109 will also be opened and the machine will stop. On the other hand if a plate does feed from the hopper the switch 105 will of course be closed and the opening of the switch 109 during the latter part of the feeding motion will not halt the operation of the machine.

Referring now to Fig. 9 there is shown a pair of switches of the plunger actuated type designated at 115 and 116 which are mounted upon the inward extending portion 84 of the lever section 81. A switch arm 117 is pivoted at 118 adjacent to these switches and has an end 119 carrying adjustable set screws for operating the respective plungers of the switches. A pin 120 on the side of the lever section 78 engages a cam end 121 of the arm 117 and the lever is held in such position by a small coil spring 122. The arrangement is obviously such that when a jam occurs and the lever section 81 moves inwardly independently of the lever section 78 the pin 120 will cam the end 121 of the arm 117 downwardly causing the set screws on its end 119 to engage and operate both switches 115 and 116. Referring now to Fig. 29 a circuit embracing the switches 105, 109, 115, and 116 will now be described. The actuating motor for driving the machine is indicated at 123 and from the electrical supply a conductor 124 is connected to one terminal thereof. The other conductor 125 from the supply is connected to the switch 115 and this switch is of the normally closed type, which is opened by actuating of this plunger. The aforesaid switches 105 and 109 are connected in parallel by conductors 126 and 127 and this parallel bank of switches is connected by a conductor 128 to the switch 115 and by conductors 129 to the other terminal of the motor 123. Thus the action of the switch arm 117 as the two sections of the actuating lever 67 pull apart will open the switch 115 to immediately interrupt the circuit to the motor 123 and stop the machine. Likewise and as has been previously described the opening of both of the switches 105 and 109 will interrupt the circuit to the motor even if the switch 115 remains closed, as will be readily understood. The switch 116 operates to control a signal lamp 130 which may be mounted upon the outer portion of the hopper and this switch is connected by conductors 131 between the lamp and one side of the supply circuit. The lamp is of course permanently attached to the other side of the circuit as clearly shown. The switch 116 is of the normally open type and the same operation of the lever 117 which stops the machine as a result of a jam will thus close the circuit to the signal lamp 130 giving a warning to the operator that the jam has occurred at that particular station. The circuit here described is of course for example only and may be duplicated at each supply station in order to provide protection against damage and against interruption of the timing of the machine, and further to indicate to the operator at what station the malfunction has occurred.

The collecting or receiving units G each comprise a shelf or bottom 135 having an opening 136 toward the stations C so that the undersides of a group of plates may be readily grasped in removing them from the shelf. The shelf 135 continues upwardly from its rear or inner end in a vertical back wall 137 which terminates at its upper edge in an inwardly turned flange 138 through which pass screws 132 which mount the collecting units on the turret A. The back wall 137 is also cut out centrally, as at 139, forming an opening through which the picker or transfer mechanism may pass as will be pointed out. Extending upwardly from the sides of the shelf 135 are side walls 140 secured to the shelf edges by screws 141 and thus is formed a receptacle in which the plates may be evenly stacked, said receptacle being open outwardly toward the stations H to receive plates therefrom and being open at the top for removing accumulated plate groups.

Plates, and separators, are transferred from the stations H to the collecting shelves 135 by gripper means or transfer mechanisms each comprising a picker head 142 which is supported at the forward or outer end of a slide 143 (Fig. 1), carried in slideways or channels formed in the upper edges of the frames F beneath the turret A. This slide 143 is moved inward and outward in radial directions by a link 145 which is pivotally connected at one end to the underside of the slide at 146 and at its other end is pivoted at 147 to the upper end of the bell crank lever J. The arrangement is such that upward movement of the hub I as previously described will swing the upper end of the bell crank lever J outward to project the picker head 142 from its normal position of Fig. 1 outward through the opening 138 in the shelf back wall 137, and out over the shelf as seen in Figs. 27 and 28. Return movement of the hub I will draw back the picker head until it will clear the collecting unit G, as seen in Fig. 1.

The picker heads 142 each comprise an L-shaped body or frame having an upstanding back or tang portion 149 grooved at its rear or inner face to fit the vertical end face of an end or head casting 152 secured to the forward or outer end of the slide 143. A stud bolt 153 projects from the face 151 through the tang 149 and a nut on the stud is used to lock the frame to the slide. Secured to the underside of the frame and projecting outwardly therefrom is a bottom plate 155, and above this plate, at each side there is a picker dog 157 pivoted at 158 on the sides of the picker frame. The dogs 157 extend forwardly over the plate 155 and at their free ends are urged downwardly toward and against the plate by any suitable spring mechanism, such as that shown in my prior application. The free, outer ends of the dogs 157 are beveled upwardly and forwardly as at 159 so that a plate or separator may be readily slipped inwardly beneath the dogs and held flat against and upon the plate 155 by the spring tension on the dogs. Also for this purpose of guiding a plate into the picker the forward or outer edge portion of the plate 155 is beveled off downwardly and outwardly as indicated at 160.

In the operation of the machine (as thus far described) as the collector unit G moves up in alignment with the supply station H it is temporarily locked in such position. The actuating hub I is moved first upwardly and then downwardly in completing the transfer of one plate from the stack to the collector and the upward movement of this member I will, as previously pointed out, strip the lowermost positive plate from the stack in the hopper and force it inwardly toward the collecting unit. At the same time the picker head 142 moves outwardly through the open back 139 of the collector unit G and prior to the completion of these movements the ejected plate P is forced beneath the picker dogs 157, and, as indicated in Fig. 26, the picker dogs thus obtain a grip upon the edge of the plate. As this occurs the motions of the stripper plate and picker head are reversed and they return toward their starting positions. The picker head, of course, carries along the plate pulling it into the collector unit G over the bottom 135 thereof, and as the picker head moves back through the opening 139 the edge of the plate strikes the edges of this opening and the picker thus is caused to disengage and drop the plate upon the bottom of the collector. The same collector unit is then moved to the next station where it will receive a separator in the same fashion and when this collector unit has traversed all the supply stations there will have been accumulated a stack of positive and negative plates and interleaved separators all in the proper order and ready for removal as a group. It is, of course, understood and has been more completely described in my earlier disclosures that all of the collector units G simultaneously receive a plate or separator as the case may be so that the accumulation of battery groups is rapidly carried out by the machine.

As set forth in my prior patents the battery plates themselves are stopped short of meeting the back 137 of each collector unit by means of fingers 162 carried by vertically slidably stop rods 163 associated with the collecting units. Normally these fingers 162 will rest of their own weight upon the collector bottom 135 or upon the uppermost battery element therein but as each collector unit moves up to a separator supply station the rods 163 are elevated so that the stops 162 will clear the separator entering the collector unit. This is for the purpose of arranging the separators in offset relation, away from the lugs of the plates, until these lugs have been burned to the connecting straps. For operating the rods 163 arms 164 are pivoted at 165 to each stationary frame F and have rollers 166 resting upon cam surfaces 167$^a$ on the levers J. The arms 164 are normally pulled downward by coil springs 165$^a$ but as the lever J operates the stripper plate and picker head to transfer plates and separators into the collector units the cam surface 167$^a$ will swing the outer end of the arm 164 upwardly. At each station which feeds the separators the outer end of the arm 164 has a lifting bar 166 which engages the lower ends of the rods 163 and elevates the stops 162 as has just been described. At the stations handling the battery plates themselves the lifting bars 166 will be omitted and the upward movement of the arms 164 will of course have no effect on the rods 163. Also as pointed out in more detail in my earlier application the arm 164 operates presser rods 167 also slidable vertically on the collector units and these rods 167 carry straps 168 on which are pads 169 and 170 for the purpose of holding the accumulated stack of plates against displacement and for guiding each plate as it is dropped from the picker head. For the operation of the rods 167 the arms 164 will at each station carry a contact plate 171 so that the pads will be elevated from the stack as each plate or separator is pulled into the collector unit as shown in Fig. 28.

It will of course be understood that the elevation of the supply station and picker units will vary around the machine in order to compensate for the growing height of the accumulated stacks in the collectors as the machine runs and for this purpose shims 172 of varying thicknesses are placed between the frames F and the base C so that the stations themselves increase in elevation progressively around the machine. Likewise the studs 153 mounting the picker heads to the picker slide are arranged in slots so that the picker heads may be adjusted in elevation as will readily be understood. The machine once set up in this fashion will operate on plates of, say, two closely related thicknesses such as plates of $\frac{1}{16}$ and $\frac{3}{32}$ inch in thickness. From time to time, however, heavier plates of $\frac{1}{8}$ of an inch or more thickness must be handled and the picker heads are provided with adjustments for this purpose as pointed out in my earlier patents while I herein show the supply stations as slidably mounted at the inner vertical edges of their housings in vertical slides 173 at the outer ends of the stationary frames F. As best shown in Figs. 2 and 8 each frame F has a transverse web 174 in which is rotatably mounted an adjusting screw 175 threaded at 176 into a lug 177 at the inner end of the housing. The screw 175 is locked as clearly shown against upward or downward displacement and it may, of course, be turned to move the housing 30 upwardly or downwardly with respect to the frame F. The downward movement is limited by a stop screw 178 threaded up through the web 174 to bear against the lower edge 179 of the housing while the upward movement of the housing is limited by a stud 180 depending through an opening 181 in the web and provided with lock nuts 182 therebelow. In practice the screw 178 and the nuts 182 will be adjusted at each station so that a normal lower position at which the machine is preset to handle the thinner plates it will only be necessary to run up the adjusting screws 175 until the upward motion is stopped by the nuts 182 in order to adjust the stations for the thicker plates.

At each station handling the battery plates I provide an aligning roller operative to contact the edge of the plate as it emerges from the hopper and urge its opposite edge against the side of the delivery opening 52 of the hopper in order to accurately deliver each plate. These rollers will engage the edges of the plate opposite the lugs thereon and will thus be reversed or arranged upon opposite sides of the stations handling positive and negative plates, as will be understood. As shown in Figs. 2, 9, 10, 11 and 12 the roller for the positive plate station is indicated at 183 and it is journaled on a pin 184 at the upper end of a swingable arm 185 having hinge lugs 186 pivotally mounted upon a vertical pin 187. This pin 187 is carried in lugs 188 at the forward corner portion of the supply station housing 30 so that the arm 185 extends inwardly and positions the roller 183 alongside the inner edge of the hopper bottom as best shown in Figs. 2 and 4. The roller 183 is yieldably biased toward the path of the plate moving outwardly on the hopper bottom by means of an expansion coil spring 189 braced between a lug 190 on the arm 185 and an adjacent corner portion 191 of the housing. Such movement of the roller 183 by the spring 189 is limited by a stop screw 192 threaded through a lower offset portion 193 of the lever 185 and engaging the inner side of the housing 30 as shown in Fig. 11. Thus in its normal position the roller 183 will stand in the path of the edge of a positive plate opposite that carrying its lug and so that as the plate is stripped from the stack and moved inwardly toward the picker head the plate will be urged laterally or transversely causing its edge to ride the edge of the opening 52. Thus the edges of the plates will all be accurately aligned in the group. The pressure of the roller on the plate must however be relieved as it is grasped by the picker head 142 and before the plate entirely leaves the supply station since otherwise the roller pressure would no doubt shift the plate from its prealigned position. For this purpose the roller 183 is moved outwardly or away from the edge of the plate, in properly timed relation to the feeding and transferring actions, by means of a push rod 194 slidably mounted in apertured lugs 195 formed on the inside of the adjacent wall 31 of the supply station housing 30. At its inner end this push rod 194 projects loosely through an opening 196 in the inner wall 197 of the housing and at this inner end the rod contacts an adjustable set screw 198 in the aforesaid offset portion 193 of the arm 185. Intermediate its ends the push rod 194 is provided with an adjustable stop collar 199 and the actuating lever section 81 has an upward projection 200 carrying at its upper end a laterally extending pin 201. The stop collar 199 is so positioned that as the actuating lever swings inwardly to feed a plate toward the picker head the pin 201 will contact the collar and urge the push rod 194 inward against the set screw 198 to thus swing the arm 185 and move the roller 183 clear of the plate. The roller 183 must be held in this position, however, until the plate is entirely clear, and I accordingly provide a latch 202 pivotally mounted on a stud 203 at the outer end of the housing 30 and having a hook 204 arranged to drop behind the end of the rod 194 as it is engaged and moved inward by the pin 201 as above described. The inner end of the latch 202 is pulled downward for this purpose by a light coil spring 205, and the latch will hold the rod 194 in position for clearing the roller 183 from the plate until the actuating lever 67 returns to its starting position ready to feed a new plate. As this occurs a pin 206 upon the lever 67 engages the upper end 207 of the trigger swinging the aforesaid hook 204 upward clear of the rod 194 and the spring 189 then immediately restores the parts to position for operation upon the next plate.

The mat feeding and cutting mechanism will now be described in detail and this mechanism is shown as arranged in connection with the positive plate supply station H although it will of course be understood that negative supply stations may be so equipped if it is desired to apply mats to the negative plates, as has been pointed out hereinbefore. As its primary supporting element the feed mechanism includes a frame casting, designated generally at 208, having a vertical tang portion 209 at its outer side which, as best shown in Figs. 15 and 18, is slidably mounted in a vertical guideway 210 which forms an upward extension at one side of the rigidly mounted casting 43 of the inner hopper end 39. An adjusting screw 211 is rotatably mounted in a lug 212 formed on the outer side of the tang 209 and the lower threaded end of this screw operates in the threaded bore of a lug 213 extended from the outer side of the guideway 210. The screw 211 is similar to the screw 175 for adjusting the supply stations and the rotation of this screw 211 will obviously raise and lower the frame casting 208 with respect to the station. Such adjustments of the frame 208 are made to accommodate the mat feed mechanism to plates of varying height as will later be pointed out in more detail. The frame casting 208 is irregular in shape and formed to support a considerable number of the elements making up the mat feed mechanism, and it includes near its upper end an elbow extension 214 whereon is mounted an electric motor 215 having its driving shaft turned inwardly toward the turret A. Mounted on this inner end of the motor 215 is a speed reducer unit 216 having output shafts 217 and 218 extending in opposite directions as best shown in Figs. 19 and 24. The motor 215 drives a pair of upper, pull-off rolls 219 and 220, and a pair of lower feed rolls 221 and 222, and the mat material which is in the form of a flexible ribbon is fed between these pairs of rolls from a large supply roll or coil 223 supported in an overhead bracket or support 224, which may be hung from the ceiling or any other overhead structure above the machine. The mounting and drive for the lower feed rolls 221—222 will first be described in detail. The roll 222 has an axially extending shaft 225 journaled through a lower portion of the frame casting 208 and provided at its end with a drive gear 226. The other feed roll 221, as best shown in Fig. 19 has a similar shaft 227 which is journaled in bearings in the lower end 228 of a swinging carrier 229 pivoted at 230 to the frame casting. The carrier 229 permits relative movements between the feed rolls 221 and 222 and the rolls are normally urged together by a coil spring 230ª appearing in Fig. 18 in order to provide for a frictional driving engagement between the rolls and material passing therebetween in a well known manner. The shaft 227 also has a drive gear 231 on its end meshing with the drive gear 226 so that the rolls are positively driven in opposite directions and it will, of course, be understood that the drive is such that the inner, facing surfaces of the rolls will move in a downward direction. The feed rolls 221 and 222 project from the frame casting 208 above the delivery end of the hopper bottom and a vertical plane passing between the feed rolls will intersect the point at which the picker head 142 meets a plate as it is fed from the hopper. The axes of the feed rolls are horizontally aligned and extend transversely with reference to the direction of movement of the plate and of the picker head for purposes later to be described. The output shaft 217 from the motor driven gear unit 216 drives the feed rolls 221—222 and as best shown in Fig. 21 the shaft 217 has pinned thereto a flanged collar 232 upon which is fastened a clutch ring 233. The collar 232 includes an extension shaft 234 on which is a bushing 235 rotatably supporting the sleeve 236 of a cooperating clutch ring 237 facing the ring 233. A collar 238 is rotatably mounted upon the shaft 234 and is keyed as indicated at 239 to turn with the sleeve 236. A nut 240 on an end of the shaft 234 engages the bearing 231 mounting the collar 238 and prevents its axial displacement. An expansion coil spring 242 is coiled around a reduced neck portion of the sleeve 236 and braced against the collar 238, and the spring thus yieldably urges the clutch ring 237 into frictional, driving contact with the ring 233. Thus the clutch ring 237 and its sleeve extension 236 are normally driven by the motor 215 but the drive may be disengaged at any time by locking the ring 237 so that the cooperating clutch surfaces slip as will be understood and as will be presently pointed out. Three change speed gears 242, 243, and 244 are mounted upon the sleeve 236 to turn therewith and a gear 245 arranged upon the frame casting 208 below this clutch structure may be engaged with any one of the three gears and driven by the clutch. The gear 245 in turn meshes with a wide faced gear 246 journaled upon a stud 247 extended from the frame casting and the latter gear 246 meshes constantly with the gear 226 to complete the chain of drive to the feed rolls 221 and 222. The gear 245 has a hub 248 adapted to journal upon a stud 249 which may be screwed, as indicated at 250 (Fig. 19) into any one of a series of three tapped sockets 250ª which are arranged to maintain the gear 245 in mesh with the gear 246, while permitting engagement of the gear 245 with any one of the three gears 242, 243 and 244 driven by the clutch unit. It will be apparent that the purpose of the stepped gears 242 through 244 is to vary the driven speed of the feed rolls 221 and 222 and the arrangement provides for three different speeds for these rolls. The gear 245 must, of course, be properly aligned with the gears 242 through 244 and for this purpose there is provided a collar 251, shown in Fig. 19, which when removed will offset the gear 245 to mesh with the gear 243. To mesh the gear 245 with the gear 244 the collar 251 is also removed and the gear 245 is turned over placing its hub 248 to the outside. In each case the collar 251 will be arranged to the out side of the gear upon the stud 249 so that it may be properly turned home in the sockets 251.

Normally the clutch ring 237 and the attached drive gears are locked against rotation so that the clutch slips, by means of a catch or stop finger 254 which overlies a radially projecting lug 255 upon this clutch ring. The stop finger 254 is mounted at the upper end of a shaft 256 journaled vertically in apertured bearings 257 on the frame casting 208 and adjacent its lower end the shaft 256 has an oppositely or inwardly projecting finger 258 to which is attached a coil spring 259 extending to a pin 260 upon an adjacent surface of the frame casting. The spring 259 biases the shaft 256 in a counterclockwise direction, as viewed from above as in Fig. 21, and in this normal position the finger 254 engages the lug 255 and the finger stops against an abutment 261 upon the upper bearing 257. For cooperation with the finger 258 each of the collector units G as shown in Figs. 18 and 24 is equipped with a bracket 262 having vertically spaced ends through which extends a pin 263 mounting a vertically elongated trip roller 264. These rollers 264 thus are so mounted that they will in succession engage the finger 258 as the turret A rotates and in passing will rotate the shaft 256 against the tension of the spring 259 and move the finger 254 clear of the lug 255. Each time this action takes place the clutch mechanism is, of course, released to drive the change speed gears 242—244 and they will make one complete revolution, until the lug 255 again comes up against the finger 254. It will be understood that as the rollers 264 pass they will first thus operate the shaft 256, and then will clear the finger 258 so that the shaft will return to its normal position shown in Fig. 21. Thus as each of the collector units G passes each of the mat feed mechanism the gear assembly 242 through 244 will be driven through one complete revolution, and this motion will be transmitted through the gear train to the feed rolls 221—222, causing a rotation of predetermined duration of these rollers, in timed relation to the operation of the machine as a whole.

The purpose of vertically elongating the trip rollers 264 is, of course, to insure the proper operation of the trip finger 258 regardless of the height to which the supply stations and mat feed mechanisms may be adjusted.

The upper pull-off rolls 219—220 are driven by the shaft 218 extending from the opposite side of the speed reducer unit 216 and this drive mechanism and the support for the rolls will now be described. The roll 219 has a long axially extending support shaft 267 which is journaled in and through a tubular bearing 268 forming a part of the casting 208, and between the rolls themselves and the adjacent end of this bearing the shaft carries a gear 269. The other pull-off roll has a similar but shorter supporting shaft 270 which is journaled at the lower end of a carrier 271, pivoted at 272 to an upper corner portion of the frame casting 208 so that relative movements between the pull-off rolls is permitted exactly as described for the feed rolls 221—222. A spring 273 engages the carrier 271 to urge the pull-off rolls together and the shaft 270 also has a gear 274 meshing with the gear 269 to cause the two rolls to operate in unison and rotate downwardly at their facing sides. It will thus be seen that by driving the shaft 267 both of the pull off rolls will be rotated and this shaft is operated by a gear 275 mounted upon the motor driven shaft 218 through an idler gear 276 and a larger gear 277 as seen in Fig. 19. Here again provision is made for driving the rolls at selected different speeds and for this purpose the drive gear 275 has two separate sets or rows of teeth of different pitch diameter and the gears 276 and 277 may be driven by either of these sets of teeth. The idler gear 276 is accordingly journaled at the end of an arm 278 having a collar portion 279 rotatably mounted about a reduced neck 280 formed at the adjacent end of the bearing 268. The collar 279 is split and provided with a clamp screw 281 so that the arm 278 may be released and swung about the axis of the shaft 267. To change speed the gear 275 is switched end for end upon the drive shaft 218 to bring either of its two sets of teeth to position for meshing with the gear 276 and the arm 278 is adjusted to maintain proper meshing relationship between the several gears, and is then refastened by a clamp screw 281.

The gear 277, as best shown in Fig. 20, is journaled with respect to the shaft 267 upon bushings 282 and the hub of this gear has clutch teeth 283 engaging similar teeth upon a clutch collar 284 slidably keyed as at 285 upon the shaft. The collar 284 is grooved to accommodate a shipper fork 286 which is secured to the end of a clutch rod 287 slidably mounted in lugs 288 on the upper side of the bearing 268 and an expansion coil spring 289 is braced between the fork 286 and the adjacent lug 288 thus normally urging the collar 284 in the direction of the gear 277 and effectively but releasably locking said gear to rotate with and drive the roll shaft 267. As seen in Fig. 19 the clutch rod 287 is connected to the plunger 290 of a clutch operating solenoid 291 mounted atop the bearing 268 and for this purpose the plunger 290 is connected as indicated at 292 to an ear 293 attached by a collar 294 to the rod. Normally, of course, the gear 277 is connected to drive the shaft 267 and rotate the pull-off rolls 219—220, but by a suitable control circuit the solenoid 291 may be operated at any time to disengage the clutch teeth 283 so that the rolls are stopped, although the motor 215 continues to run. The purpose of this control will be presently made clear.

In practice the ribbon-like mat material is pulled off from the supply roll 223 and passed downwardly through and between the pull-off rolls 219—220 and then through the feed rolls 221 and 222 and the rotation of these rolls will obviously pull the material downwardly and deliver it in a vertical plane down between the supply station H and the adjacent collector unit G. The various gear ratios are so proportioned that the pull-off rolls 219—220 rotate at a slower speed than do the feed rolls 221—222 but a slack loop of material will gradually accumulate between the upper and lower sets of rolls due to the fact that the upper rolls run continuously. To take up this slack there is provided an elongated take-up roller 294 which is journaled at the end of an arm 295 pivoted at 296 to an upper extension lug 297 formed at the upper end of the frame casting 208. The arm 295 extends beyond the pivot 296 in the form of a finger 298 and a light coil spring 299 is stretched between this finger and an ear 300 upon the bearing 268 below, so that the roller end of the arm is yieldably urged in an upward direction away from the path of the material passing between the upper and lower sets of rollers. After the material is threaded between the pull-off rolls 219—220 it is then run over the roller 294 and then back over an arcuate guide plate 301 mounted for this purpose upon the side of the casting 208. The material then runs down between the feed rolls 221—222 and it will be apparent that the upward swinging tendency of the arm 295 will cause the roll 294 to take up the slack in the material between the upper and lower sets of rolls. Since these upper rolls operate constantly while the lower rolls operate cyclically and the upper rolls feed material faster than it is taken off by the lower rolls it follows that the amount of slack between the rolls will be constantly increasing in the operation of the machine. When the amount of this slack has built up to a predetermined maximum and the arm 295 has swung to an uppermost position, which is indicated at 295ᵃ in Fig. 1, the end of the finger 298 will contact and close a conventional limit switch 302 mounted in a proper position for this purpose upon the casting 208. This switch 302 is employed to control an electrical circuit supplying the aforesaid solenoid 291, and when this switch is thus closed the solenoid will be energized to pull upon the rod 287 and disengage the clutch teeth 283 to halt the operation of the pull-off rolls, 219—220. The next operation of the feed rolls 221—222 will then take up the accumulated loop or slack and in doing so will swing the arm 295 downwardly, to the position indicated at 295ᵇ in Fig. 1, and as the arm reaches this position it contacts another limit switch 303 mounted upon the side of the frame casting. This switch when thus operated opens the circuit to the solenoid 291 so that the clutch teeth 283 are reengaged and the pull-off rolls again draw material from the supply roll 223. Further details of the operation of the feed mechanism will be pointed out in the detailed discussion of the operation of the machine as a whole appearing later in this specification. The limit switch 303 should permit the arm 295 to override somewhat as it swings down so that the material will not be jerked and possibly torn as its slack loop is taken up as just described.

The mat material fed downwardly through the feed rolls 221—222 passes endwise between a pair of upper guides indicated at 304—305 which are supported at their ends upon the frame casting 208, extend out beneath the feed rolls, parallel with the axes thereof, and are long enough to engage the full width of the material. The upper, inner edges of the guides 304—305 flare apart as indicated at 306 in Fig. 7 in order to guide the material into the relatively narrow space 307 between the lower portions of the guides and the material issuing through this space 307 then enters the flaring upper ends 308 of a pair of somewhat similar lower guides 309 and 310. These guides 309 and 310 are respectively secured to the guide 304 and to the frame casting as designated at 311 and of course extend out parallel beneath the upper guides also engage the full width of the material. The lower guides 309 and 310 stand some distance above the point at which the plates issue from the supply station and it will be noted that the lower edge of the innermost guide 310 is rounded off, as indicated at 312, in order not to interfere with the folding of the mat material about the plates as will presently appear. The material passing downwardly through these two sets of guides moves down inside of the supply station in a vertical plane and below the point at which the plates are ejected from the supply station the lower edge of the material will enter between the diverging upper ends 313 of guide rods 314 which are anchored at their lower ends upon a base plate 315, forming part of a frame bracket 316 secured to the inner end 197 of the supply station housing 30. As seen in Fig. 4 there are two closely spaced pairs of the rods 314 at each side spaced apart transversely slightly less than the width of the material, and as the material enters at its lower ends between the rods it contacts adjustable stop plates 317, one of which is arranged between the two sets of guide rods 314 at each side of the base plate 315. These plates 317 are thus guided by the rods 314 and may be moved inwardly or outwardly with respect to the adjacent supply station by means of an L-shaped control rod 318. One end 319 of this rod extends through central portions of the stop plates 317 and outwardly through a slot 320 in the adjacent end wall 321 of the frame bracket 316, so that the other arm 322 of the rod may extend loosely outward alongside the supply station housing 30. This arm 322 is provided with a knob 323 at its outer extremity and inwardly thereof has three notches 324 at its lower side any one of which may be engaged with a lug 325 projecting laterally from the adjacent side 31 of the supply station. By selectively adjusting the notches 324 into engagement with the lug 325 the control rod 318 may be moved inwardly or outwardly to correspondingly adjust the stop plates 317 with reference to the guide rods 314 and the material entering therebetween. At their outer ends the stop plates 317 have tail portions 326 loosely mounted through slots 327 in the frame bracket 316 in order to provide a further guide for the stop plates, and the outward movement of the plates is limited by stop pins 328 as will be clearly understood in Fig. 13. The purpose of this adjustment of the stop plate 317 is to bring any one of three different steps or shoulders 329 on their inner edges into position for engaging the lower end of the material as it enters between the guide rods 314, thus permitting the material to be stopped at three different elevations with respect to the plane at which the plates are fed from the supply stations.

The upper inner guide 304 has a lower corner shear edge 330 which cooperates with a shear or scissor blade 331 supported for horizontal swinging motion beneath the opposite guide 305, and this shear blade has a tang portion 332 slidably mounted in a groove 333 formed in the upper side of the flanged end 334 of a sleeve 335. This sleeve 335 is splined at 336 upon the upper end of a shear operating shaft 337 journaled in an upper bearing lug 338 formed as a part of the frame casting 208. Located above the bearing lug 338 is a collar 339 which is pinned upon the shaft and an expansion coil spring 340 is braced between this collar and the flange 334 urging the shear tang up against a wear and aligning plate 341. Projecting upwardly into the groove 333 in the flanges 334 is a short stud 342 and this stud enters an opening 343 formed in the tang 332 to prevent endwise displacement of the shear blade 341. Access may be had however, from the side, to the sleeve 335 so that it may slide downwardly against the tension of the spring 340 to release the stud 342 from the opening 343 and when this is done the shear blade 331 may be pulled endwise out of the groove for sharpening or replacement, this being one purpose of the spring mounting just described. The spring mounting, of course, also functions to insure proper shearing engagement between the shear blade and its corresponding shear edge 330 and to take up wear as it occurs.

The shear operating shaft 337 extends downwardly alongside the stationary frame F toward a bearing lug 344 hung by a bracket arm 345 from the frame bracket 316 and below this lug the shaft has pinned thereto an arm 346 extending horizontally inward through an opening 347 in the adjacent side wall 348 of the stationary frame F. At its swinging end the arm 346 has a vertically elongated finger 349 located immediately alongside the pull rod 90 which operates the plate feeding cross head mechanism as previously described. The rod 90 is provided with two spaced adjustable actuating collars 350 and 351 which, when properly adjusted upon the rod, will engage the finger 349 and oscillate the shear operating shaft 337 as the plate feeding mechanism operates. The oscillation of the shaft 337 will, of course, operate to swing the shear blade 331 from its normal position as shown in Fig. 6 clear of the path of the material, toward and across the space 307 between which the mat material issues from the guides 304—305, and return, and this actuation of the shear blade will obviously cause it to cooperate with the edge 330 to cut off the material at that point.

The finger 349 is vertically elongated to compensate for vertical adjustments made on the mat feed mechanism and supply station.

The operation of the machine as a whole will now be described and it will be assumed at the outset that the machine is in operating condition and has just gone through a previous cycle of operation. As the turret A now starts up and passes through another rotation step, as pointed out in my earlier patent, in order to bring all of the collector units G up to alignment with the next supply stations H in succession, the turret travels in the direction of the arrow in Fig. 24 and the trip roller 264 of one station engages the finger 258 of the adjacent mat feed mechanism. The shaft 256 then releases the lug 255 and the clutch rings 233—237 then drive the gears 242—244 one complete revolution, this motion being completed while the turret is moving the collector units to the next supply stations. In practice, the turret travels one-third of the cycle, and remains at rest during the feeding and transferring actions for the remaining two-thirds. The rotation of the gears is transmitted to the feed rolls 221—222, as has been described, and a predetermined length of the mat material is fed downwardly through the guides 304—305 and 309—310 and into the support rods 314. The parts are so adjusted, as will presently appear, that the amount of material thus fed down through the feed rolls will come to rest with its lower edge hanging just clear of one of the steps 329 on the stop plates 317. By this time the machine has come to rest with the mat material at each positive plate station, or other station at which mat feed mechanism has been installed, hanging down in the path through which the plates will be transferred to the collector units. The actuating hub or cross-head I will now be raised and lowered, the pull rods 90 will move the stripper cross-heads 48 inward and outward and pushes the picker heads 142 outward and then back inward, completing the transferring operation as has been described hereinbefore.

Turning now to a detailed consideration of the actions taking place at the positive plate station shown in the drawing, the initial inward travel of the stripper cross head, by the pull rod 90, causes the stop collar 351 to engage the finger 349 and turn the shear operating shaft 337 in the proper direction to swing the shear blade 331 across the shear edge 330 and shear off the mat which hangs below. As this occurs the sheared-off mat drops until it rests upon the stop plates 317 and at this point it may be noted that the mat material is of a "springy" nature in that it will stand erect, without folding or collapsing, when thus sheared off and dropped. The shearing action takes place, due to the location of the stop collar 351 which initiates it, before the plate being stripped from the hopper reaches the mat, of course. Now referring to Figs. 25 through 28 it will be seen in Fig. 25 that as the inwardly moving plate P reaches the point at which the sheared-off mat M is standing the picker head 142 will reach the opposite, or inner, side of the mat. These relatively opposite movements of the plate and picker head will continue until the picker dogs 157 obtain a grip upon the plate, as seen in Fig. 26 and as this takes place the parts of the mat M above and below the edge of the plate P will be folded over the opposite upper and lower surfaces of the plate. The ends of the mat will pull out of the guides 309—310 and the diverging ends of the guide rods 314 as this occurs and by the time the picker has obtained a firm grip upon the mat and plate and started on its path back inwardly into the collector unit G, the mat ends will pull clear and snap flat against the upper and lower sides of the plate. Here again the nature of the material used enters the picture, in that its tendency to straighten out causes the end portions beyond the points gripped between the picker dogs and plate 155 to snap flat against the battery plate as these ends pull out of the guides.

The completion of the transferring action takes the plate P and applied mat into the collector unit and as the plate pulls out of the picker head and drops onto the stack in the collector unit the presser pads 169 and 170 will keep the upper flap of the mat from springing upward. It will be noted in Fig. 28 that in the next operation, when the next separator S is being pulled into the collector, the upper flap of the mat will spring upward but will be held down by the plate 155 on the picker head so that it cannot swing up far enough to get in the way of the return movement of the picker head.

It will, of course, be readily understood that the cut-off mat section M must be accurately centered with respect to the edge of the plate P over which it is folded so that the mat material will be evenly distributed over the opposite sides of the plate. It is for this purpose that the stop plates 317 are provided and that the mat as the section is cut off is permitted to drop a short distance and stand upon the stop plates. The three steps 329 provided upon the stop plates 317 may be moved selectively by means of the control rod 318 into position for engaging and supporting the mat and centering it with respect to plates of the three commonly encountered vertical dimensions. In other words, the lowermost step 329 will be used as in Fig. 14 for centering the longest mats for the highest plates, etc. This is also the purpose for the adjustment of the entire mat feed mechanism by the screw 211 and in practice the feed mechanism is raised when plates of the higher variety are being assembled. In effect, this latter adjustment varies the elevation of the shear plate 331 and the overall length adjustment necessary for the mats or plates of this height is evenly divided by this adjustment and that provided by the several steps 329 on the stop plates 317.

It is also for this same purpose of accommodating the mat feed to plates of different height that the three speeds for the feed rolls 221—222 are provided by the three gears 242 through 244. The end result of the several adjustments is the accurate feeding and shearing of mat sections of the required length to cover the entire active area of battery plates of all commonly encountered dimensions, as will be readily understood. It will be necessary when the speed of the feed rolls 221—222 are increased to the maximum to provide a higher speed for the pull off rolls 219—220, and this is accomplished by reversing the gear 275 upon the shaft 218 as has been previously described. Inasmuch, however, as the intermittent or cyclical operation of the feed rolls 221—222 as compared to the continuous operation of the pull off rolls and the fact that the upper rolls feed faster than the material is taken off by the lower rolls causes the quite rapid accumulation of slack between the sets of rolls, it is not believed necessary to provide for three speed adjustments of the upper rolls.

As the slack loop accumulates between the upper and lower sets of rolls, it is taken up, as has been described, between roller 294 and it may here be noted that the arm 295 is so dimensioned that the extent of this loop before the drive to the upper rolls is cut off, is such that the next cyclical operation of the feed rolls 221—222 will take up only the major portion of the loop before the upper rolls are re-started. Thus, there will never under any condition occur a jerking or snapping action upon the material between the rolls such as might rupture it or even tear it off and cause the interruption of the proper timing with the rest of the machine. It will be obvious that the time during which the pull-off rolls 219—229 are stopped will be so short that they will to all intents and purposes operate continuously so that the material being pulled off the supply roll 223 will have no tendency to over-run or backlash.

Following the folding of the mat material over the positive plate as described in and as shown in Figs. 25–27, the turret A will start another step in its travel and for the first one-third of the next cycle the trip finger 258 will be engaged by the next trip roller 264 causing the feed rolls to pull off another length of material ready for the next operation. Thus it will be seen that the material feed is timed with respect to the movements of the turret A; whereas, the mat shearing operation is timed with respect to the travel of the stripper cross head or the delivery of the plate from the supply station. As pointed out in detail in my earlier Patent No. 2,324,523, the operation of feeding, transferring and picker elements are, however, all themselves related and synchronized with the operation of the turret, thus bringing all of the various operations into proper timed relation. It may here be noted that the innermost stop collar 350 will, of course, be so located upon the pull rod 90 that it will engage the finger 349 in an outward direction and swing the shear blade 331 clear of the path of the material when the stripper cross head returns to its starting position. Actually, of course, the shear blade 331 is moved in one direction by the collar 351 to cut the material and is then returned to starting position by the collar 350 as will be clearly evident from Figs. 1 and 2.

It is to be understood, of course, that I do not limit myself to the use of the fiber glass mats and that other materials which may not now be known may be used if they are suitable. In fact materials may be developed which would themselves act as insulators and the use of the separators S be either completely or partially eliminated. My machine is readily applicable and in fact is so versatile as to accommodate almost any conceivable possible combinations of plates, mats and separators which may be encountered.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In a machine for assembling battery plates, wherein flexible mat material is fed from a roll and folded over the plates, a supply station containing a stack of plates, a receiving unit movable in a path past said stations, a stripping mechanism at said station for successively projecting one plate from the stack horizontally toward the path of said receiving unit, a gripper means movably associated with the receiving unit for reciprocation toward and away from the supply station and having means for engaging over opposite surfaces of the projected plate and transferring the plate to the receiving unit, means adjacent said station for intermittently feeding the mat material, means adjacent said station for cutting the material into mats of predetermined sizes to match plates of corresponding sizes, said feeding means disposing a flexible mat in vertical position in the path of the plate as it moves from the station to the receiving unit whereby operation of the gripper means will fold the mat over the plate, stop means having a vertically stepped upper face for engaging and positioning the mat for accurately centering the mat with plates of different sizes, means for shifting the stop means transversely of the mat for the centering of the mats for differently sized plates, and means for vertically adjusting the cutting means in accordance with the position of said stop means whereby mats of desired size are cut.

2. In a machine for assembling battery plates, wherein flexible mat material is fed from a roll and folded over the plates, a supply station containing a stack of plates, a receiving unit movable in a path past said station, a stripping mechanism at said station for successively projecting one plate from the stack horizontally toward the path of said receiving unit, a gripper means movably associated with the receiving unit for reciprocation toward and away from the supply station and having means for engaging over opposite surfaces of the projected plate and transferring the plate to the receiving unit, means adjacent said station for intermittently feeding the mat material, means adjacent said station for cutting the material into mats of predetermined sizes to match plates of corresponding sizes, said feeding means disposing a flexible mat in vertical position in the path of the plate as it moves from the station to the receiving unit whereby operation of the gripper means will fold the mat over the plate, stop means having a vertically stepped upper face for engaging and positioning the mat for accurately centering the mat with plates of different sizes, guide rods for directing the cut mat onto the stop means, means for shifting the stop means transversely of the mat for the centering of the mats for differently sized plates, and means for vertically adjusting the cutting means in accordance with the position of said stop means whereby mats of desired size are cut.

3. In a machine for assembling battery plates, wherein flexible mat material is fed from a roll and folded over the plates, a supply station containing a stack of plates, a receiving unit movable in a path past said station, a stripping mechanism at said station for successively projecting one plate from the stack horizontally toward the path of said receiving unit, a gripper means movably associated with the receiving unit for reciprocation toward and away from the supply station and having means for engaging over opposite surfaces of the projected plate and transferring the plate to the receiving unit, means adjacent said station for intermittently feeding the mat material, means adjacent said station for cutting the material into mats of predetermined sizes to match plates of corresponding sizes, said feeding means disposing a flexible mat in vertical position in the path of the plate as it moves from the station to the receiving unit whereby operation of the gripper means will fold the mat over the plate, and when disengaged from the plate and mat will hold the upper flap of the folded mat downwardly, stop means having a vertically stepped upper face for engaging and positioning the mat for accurately centering the mat with plates of different sizes, means for shifting the stop means transversely of the mat for the centering of the mats for differently sized plates, and means for vertically adjusting the cutting means in accordance with the position of said stop means whereby mats of desired size are cut.

4. In a machine for assembling battery plates, wherein flexible mat material is fed from a roll and folded over the plates, a supply station containing a stack of plates, a receiving unit movable in a path past said station, a stripping mechanism at said station for successively projecting one plate from the stack horizontally toward the path of said receiving unit, a gripper means movably associated with the receiving unit for reciprocation toward and away from the supply station and having means for engaging over opposite surfaces of the projected plate and transferring the plate to the receiving unit, means adjacent said station for intermittently feeding the mat material, means adjacent said station for cutting the material into mats of predetermined sizes to match plates of corresponding sizes, said feeding means disposing a flexible mat in vertical position in the path of the plate as it moves from the station to the receiving unit whereby operation of the gripper means will fold the mat over the plate, stop means having a vertically stepped upper face for engaging and positioning the mat for accurately centering the mat with plates of different sizes, means for shifting the stop means transversely of the mat for the centering of the mats for differently sized plates, and means for varying the distance between the cutting means and the stop means whereby mats of desired size are cut.

ARTHUR D. LUND.

REFERENCES CITED

The following references are of record in the file of this patent:

UNITED STATES PATENTS

| Number | Name | Date |
|---|---|---|
| 148,743 | Packer | Mar. 17, 1874 |
| 936,480 | Sague | Oct. 12, 1909 |
| 1,073,324 | Bredenberg | Sept. 16, 1913 |
| 1,297,131 | Etheridge | Mar. 11, 1919 |
| 1,583,339 | Conley | May 4, 1926 |
| 1,727,208 | La Bombard | Sept. 3, 1929 |
| 2,165,676 | Rhodes | July 11, 1939 |
| 2,227,514 | Elser | Mar. 24, 1942 |
| 2,296,479 | Nichols | Sept. 22, 1942 |
| 2,324,523 | Lund | July 20, 1943 |
| 2,338,050 | Nelson | Dec. 28, 1943 |
| 2,373,082 | Staelin | Apr. 3, 1945 |
| 2,400,475 | Tong | May 14, 1946 |
| 2,436,192 | Braun | Feb. 17, 1948 |
| 2,482,060 | Gates | Sept. 13, 1949 |
| 2,523,910 | Lund | Sept. 26, 1950 |

FOREIGN PATENTS

| Number | Country | Date |
|---|---|---|
| 71,460 | Switzerland | June 9, 1914 |
| 651,545 | Germany | Oct. 15, 1937 |